United States Patent
Chang et al.

(10) Patent No.: US 10,616,652 B2
(45) Date of Patent: Apr. 7, 2020

(54) PLAYBACK METHOD AND ELECTRONIC DEVICE USING THE SAME

(71) Applicant: Novatek Microelectronics Corp., Hsinchu (TW)

(72) Inventors: Wei-Chung Chang, Taipei (TW); Hsiang-An Wang, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/668,713

(22) Filed: Aug. 4, 2017

(65) Prior Publication Data
US 2018/0041809 A1 Feb. 8, 2018

Related U.S. Application Data

(60) Provisional application No. 62/370,718, filed on Aug. 4, 2016.

(51) Int. Cl.
*H04N 21/472* (2011.01)
*H04L 29/06* (2006.01)
(Continued)

(52) U.S. Cl.
CPC ... *H04N 21/47217* (2013.01); *H04L 65/4084* (2013.01); *H04L 65/4092* (2013.01);
(Continued)

(58) Field of Classification Search
CPC ........... H04N 21/437; H04N 21/47217; H04N 21/2662; H04N 21/4333; H04N 21/6377;
(Continued)

(56) References Cited

U.S. PATENT DOCUMENTS 7,773,581 B2  8/2010 Punj et al.
8,775,664 B2 * 7/2014 McCoy .............. H04N 21/4333
                                           709/232
(Continued)

FOREIGN PATENT DOCUMENTS

CN     104750358     7/2015
CN     105100915     11/2015

OTHER PUBLICATIONS

Akhshabi et al., " What Happens When HTTP Adaptive Streaming Players Compete for Bandwidth? " Proceedings pf the 22nd international workshop on Network and Operating System Support for Digital Audio and Video , Jun. 7-8, 2012, pp. 9-14.
(Continued)

*Primary Examiner* — James R Sheleheda
(74) *Attorney, Agent, or Firm* — JCIPRNET

(57) ABSTRACT

The disclosure proposes a playback method including displaying a first playback session which comprises an on-demand streaming session in a foreground of a display of the electronic device; switching, at a first playback time ($t_1$), the first playback session from being displayed in the foreground to a background in which the on-demand streaming session ceases streaming; recording the t1 and a first clock time ($T_1$) in response to switching the first playback session from being displayed in the foreground to the background; switching the first playback session back from the background to being displayed in the foreground; recording a second clock time ($T_2$) in response to switching the first playback session back from the background to being displayed in the foreground; and changing the on-demand streaming session as being displayed in the foreground to a second playback time ($t_2$) which is determined according to $t_2 = t_1 + (T_2 - T_1)$.

22 Claims, 14 Drawing Sheets

(51) Int. Cl.
*H04N 21/6373* (2011.01)
*H04N 21/433* (2011.01)
*H04N 21/2662* (2011.01)

(52) U.S. Cl.
CPC ....... *H04L 65/608* (2013.01); *H04N 21/2662* (2013.01); *H04N 21/4333* (2013.01); *H04N 21/6373* (2013.01)

(58) Field of Classification Search
CPC ............ H04N 21/6373; H04L 65/4084; H04L 65/608; H04L 65/4092
See application file for complete search history.

(56) References Cited

U.S. PATENT DOCUMENTS

| | | | | |
|---|---|---|---|---|
| 9,912,712 | B2* | 3/2018 | McCoy | H04N 21/4333 |
| 2001/0010682 | A1 | 8/2001 | Schoenblum et al. | |
| 2006/0059223 | A1 | 3/2006 | Klemets et al. | |
| 2010/0129058 | A1* | 5/2010 | Koyano | H04N 5/76 386/241 |
| 2011/0161485 | A1* | 6/2011 | George | H04L 65/4069 709/224 |
| 2012/0140119 | A1 | 6/2012 | Chang et al. | |
| 2012/0209961 | A1* | 8/2012 | McCoy | H04N 21/4333 709/219 |
| 2014/0126774 | A1* | 5/2014 | Masuda | G11B 15/6835 382/103 |
| 2014/0281973 | A1* | 9/2014 | Klappert | G06F 16/4387 715/716 |
| 2014/0325029 | A1* | 10/2014 | McCoy | H04N 21/4333 709/219 |
| 2015/0334170 | A1* | 11/2015 | Panguluri | H04N 21/26258 709/201 |
| 2015/0382057 | A1* | 12/2015 | Huang | H04N 21/44204 725/14 |
| 2016/0381163 | A1* | 12/2016 | Mashtakov | H04L 67/1097 709/205 |
| 2017/0126774 | A1* | 5/2017 | Woodman | G11B 27/105 |
| 2017/0134466 | A1* | 5/2017 | Giladi | H04L 65/602 |
| 2017/0171590 | A1* | 6/2017 | Ma | H04N 21/8456 |
| 2018/0041809 | A1* | 2/2018 | Chang | H04N 21/4333 |

OTHER PUBLICATIONS

"Office Action of China Counterpart Application", dated Apr. 28, 2019, p. 1-p. 10.

\* cited by examiner

PLAYBACK METHOD AND ELECTRONIC DEVICE USING THE SAME

CROSS REFERENCE TO RELATED APPLICATION

This application claims the priority benefit of U.S. Application provisional application Ser. No. 62/370,718, filed on Aug. 4, 2016. The entirety of the above-mentioned patent application is hereby incorporated by reference herein and made a part of specification.

TECHNICAL FIELD

The disclosure is directed to a playback method used by an electronic device and an electronic device using the same method.

BACKGROUND

Adaptive bitrate streaming refers to a technique that has been used in multimedia streaming over a computer network. While most multimedia streaming technologies has utilized one or more streaming protocols such as RTP with Real Time Streaming Protocol (RTSP), more recent adaptive streaming technologies are implemented almost exclusively based on Hypertext Transfer Protocol (HTTP) and are designed to function efficiently over large distributed HTTP networks, such as the Internet.

Most recent adaptive streaming technologies may function by detecting a user's bandwidth and CPU capacity in real time and subsequently by adjusting the quality of a video stream of the user accordingly. Such endeavor may require the use of an encoder to encode a single video at multiple bitrates. The video playing client could then switch among video streams in different encoded bitrates based on resources available to the user at that time. The above described adaptive streaming technology would benefit from very little buffering and fast initiating time and would result in good user experiences for both high-end and low-end connections.

As more recent adaptive streaming technologies have been implemented based on adaptive bitrate streaming which would encode a video source with different bitrates, each of the video streams of the different bitrates could be segmented into smaller parts as each part may contain a video segment of a few milliseconds. The streaming client device is made aware of available streams at differing bitrates and segments of the streams by a manifest file. When a video streaming session starts, the client may request the segments to be received from the stream with the lowest bitrate. If the client device has determined that its potential download speed is higher than the bitrate of a segment to be downloaded, then the client device may request to download the segment at a higher bitrate. Subsequently, if the client device has determined that the network throughput has deteriorated to the point that the download speed for a segment is lower than the bitrate of the segment, then the client device will request for a lower bitrate segment. The segment sizes may vary and may depend on design considerations, but each segment could typically be downloaded between two to ten seconds.

Besides traditional satellite television services, more and more television services are accessed by Internet protocol suite over a packet-switched network such as a Local Area Network (LAN) or the Internet. Internet Protocol Television (IPTV) is a general term used to describe a mean of delivering television services over the internet. The types of programs which the IPTV may provide could be demarcated into various ways. For example, the IPTV may provide linear TV, Time-Shifted TV, Video on Demand (VOD), and so forth. Linear TV could be simply plain live television programing broadcasted over the Internet. Time-Shifted TV is a service which allows viewers to watch past television programs on demand. Some services may be able to remove advertisements from the past television programs. VOD generally has nothing to do with television programing but is a catalogue based service which allows a user to watch movies based on their preferences.

Developed from experience of viewing televisions, people could be familiar with a playback system which has a plurality of channels. The audiences may also be used to switch among many channels whichever piques their interests. For example, a user may temporarily switch from channel A to channel B if the program of channel A does not interest the user. After a period of time, the user may switch back to channel A and see if channel A shows any contents of interests. Based on characteristics of live broadcasts for linear TV, when a user switch to another channel, the program of original channel would still broadcast continuously. Hence, the user does not cope with the content which does not interest the user by skipping ahead or by changing the content through other means but instead simply by letting the time passes.

Presently, watching streaming media is among popular reasons to access the Internet. Although the streaming media may not be a live program, users usually would use mobile devices such as smart phones or tablets to play the streaming media via the interne. The desktop PC, laptop or IPTV are also alternative ways to access streaming media. To facilitate the access of streaming media, content providers often provide customized mobile applications (Apps) such as YouTube, Dailymotion or Netflix. The Apps usually has a usable user interface (UI). Another way to access streaming media may include using browsers that support <video> or <audio> tags of the HTML5 standard.

To some extent, a user may regard each streaming media as a channel of traditional TV. One difference between a streaming media and the traditional TV is that a non-live streaming media has a fixed running time. For example, each movie of Netflix has a fixed running time which spans from one to several hours. Under this model, it would be conceivable that there could be millions of streaming channels on a particular content provider's website. Similar to linear TV, a user may either access one of such streaming channels or switch to another if the current program of the channel being accessed does not interest the user. Similar to linear TV, a user would expect that if the user switches away from a channel of interest without pressing "pause", the streaming content of the channel will keep on streaming. Consequently, when the user switches back to original channel of interest after a portion of the streaming content has played out, the user would be able to watch the remaining portion.

However, in general, the above described functionality is not supported by mobile electronic devices or other low-end devices. A comparison between a typical mobile device (or a device with limited computational ability) and a typical desktop PC (or a laptop PC or a similar device with a more powerful computational ability) reveals that the typical mobile device would generally have a worse central processing unit (CPU), a lower double data rate (DDR) frequency, a smaller screen, and a nearly non-existent support of multi-tasking.

Presently, while modern mobile operating system (OSs) does support multiple Apps running simultaneously, few, if any, would actually allow a user to see two or more Apps windows at the same time. Under such single-window constraint, tasks such as checking a calendar or writing an email would be tedious since the user must move back and forth between Apps. To transfer information from one App to another, the user must resort to either the traditional copy-and-paste or to find another way to store that information. Thus, it could be certain that multitasking in a mobile device such as in a smart phone could be needed for many circumstances.

For example, some devices may only have a hardware codec. A device may merely support decoding one-way video stream to a movie with full high definition (FHD) 60 fps or dual way to a movie with high definition (HD) 60 fps at the same time. Since a resource such as a different video codec has a mutually exclusive property, only limited processes could utilize the video codec simultaneously. Hence, a video codec would impose a physical constraint in the number of actual sessions that can be launched concurrently.

As a practical application, FIG. 1 illustrates an example of two playback sessions displayed on a mobile electronic device in which two pages (or tabs) are opened on a chrome browser, and both pages (or tabs) may connect to a video streaming service such as YouTube. Each of the two pages (or tabs) has a playback session. Suppose that a first one of the playback sessions is being played first and subsequently a second one of the playback session is being played later, the first one of the playback session would cease playing.

Table 1 shows a summary of popular browsers on a mobile device (smart phone) with regard to various capabilities of each of the browsers.

TABLE 1

| | Mobile Device | | |
|---|---|---|---|
| | Chrome | Opera | Firefox |
| Could play multiple sessions? | No | No | Yes |
| Background playback? | — | — | Yes |

From Table 1, it can be seen that, for mobile devices, some browsers do not support launching multiple playback sessions simultaneously.

Table 2 shows a summary of popular Apps on a mobile device (smart phone) with regard to various the capability of supporting multiple sessions.

TABLE 2

| | Mobile Device | | | |
|---|---|---|---|---|
| | YouTube | Dailymotion | Netflix | Iqiyi |
| Could play multiple sessions? | No | No | No | No |

As seen in Table 2, none of the Android Apps would support multiple playback sessions. This means that if streaming content B is switched to while streaming content A is being played back, then streaming content A would be stopped automatically. Although some Apps often provide the functionality to bookmark a breakpoint for the streaming content A and playback from the break point once the user has returned to the streaming content A, obviously the process still does not resemble a linear TV which would simply keep on streaming. However, it might make more sense for a user to determine whether the streaming of A would stop or not. Moreover, a user may also prefer to continuously stream several movies simultaneously, even by using a mobile device with limited hardware resources.

Table 3 shows a summary of popular browsers on a Desktop or laptop computer with regard to various capabilities of each of the browsers.

TABLE 3

| | Desktop (laptop) Device | | | |
|---|---|---|---|---|
| | Chrome | Opera | Firefox | IE |
| Could play multiple sessions? | Yes | Yes | Yes | Yes |
| Background playback? | Yes | Yes | Yes | Yes |

From Table 3, it can be seen that for adaptive streams could be display more efficiently if there is a scheduling policy that distinguishes between background and foreground playback sessions.

Referring back to Table 1 and Table 3, another issue in which could be applicable to the mobile device and the desktop/laptop computer is that when a streaming content is no longer streaming under the circumstance when the streaming content is switched to the background of a display such as being switched as a background window, a background frame, a background tab, and etc., the streaming content may still be downloading, and thus bandwidth could be wasted from such downloads. Moreover, regardless of whether an electronic device is a mobile device or a desktop/laptop computer, the device might automatically try to download and decode streams and thus would waste the system resources even further.

One example which involves the above described scenario is to open multiple tabs, and each of the tabs shows a streaming content which is hosted by an external server and can be shown on a Firefox browser of the mobile device. The Firefox browser may allow a user to open several tabs at the same time. However, as being limited by the small screen size on mobile device, at most one tab, the active tab, could be displayed on the Firefox browser. The tabs not displayed on the Firefox browser might still be downloading and pre-buffering without any scheduling and thus would waste the system resources.

SUMMARY OF THE DISCLOSURE

The disclosure is directed to a playback method used by an electronic device and an electronic device using the same method.

In one of the exemplary embodiments, the present disclosure is directed to a playback method used by an electronic device. The method would include not limited to: displaying a first playback session which comprises an on-demand streaming session in a foreground of a display of the electronic device; switching, at a first playback time ($t_1$), the first playback session from being displayed in the foreground to a background in which the on-demand streaming session ceases streaming; recording the first playback time ($t_1$) and a first clock time ($T_1$) in response to switching the first playback session from being displayed in the foreground to the background; switching the first playback session back from the background to being displayed in the foreground; recording a second clock time ($T_2$) in response to switching the first playback session back from the background to being displayed in the foreground; and changing the first playback session as being displayed in the foreground to a second playback time ($t_2$) which is determined according to $t_2=t_1+(T_2-T_1)$.

In one of the exemplary embodiment, the present disclosure is directed to an electronic device which includes not limited to: a transceiver; a non-transitory storage medium; an electronic display; and a processor coupled to the transceiver, the storage medium, and the display and configured at least for: displaying, via the display, a first playback session which comprises an on-demand streaming session in a foreground of a display of the electronic device; switching, at a first playback time ($t_1$), the first playback session from being displayed in the foreground to a background in which the on-demand streaming session ceases streaming; recording the first playback time ($t_1$) and a first clock time ($T_1$) in response to switching the first playback session from being displayed in the foreground to the background; switching the first playback session back from the background to being displayed in the foreground; recording a second clock time ($T_2$) in response to switching the first playback session back from the background to being displayed in the foreground; and changing the first playback session as being displayed in the foreground of the display to a second playback time ($t_2$) which is determined according to $t_2=t_1+(T_2-T_1)$.

In one of the exemplary embodiment, the present disclosure is directed to an electronic device which includes a transceiver; an electronic display; and a processor coupled to the transceiver and the display and configured at least for: opening a plurality of playback sessions comprising a first playback session and a second playback session, wherein each of the plurality of playback sessions is associated with an activity level; assigning a first priority order of a plurality of priority orders to the first playback session based on the activity level of the first playback session and a second priority order of the plurality of priority orders to the second playback session based on the activity level of the second playback session; and downloading, via the transceiver, the first playback session according to a first download policy associated with the first priority order.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
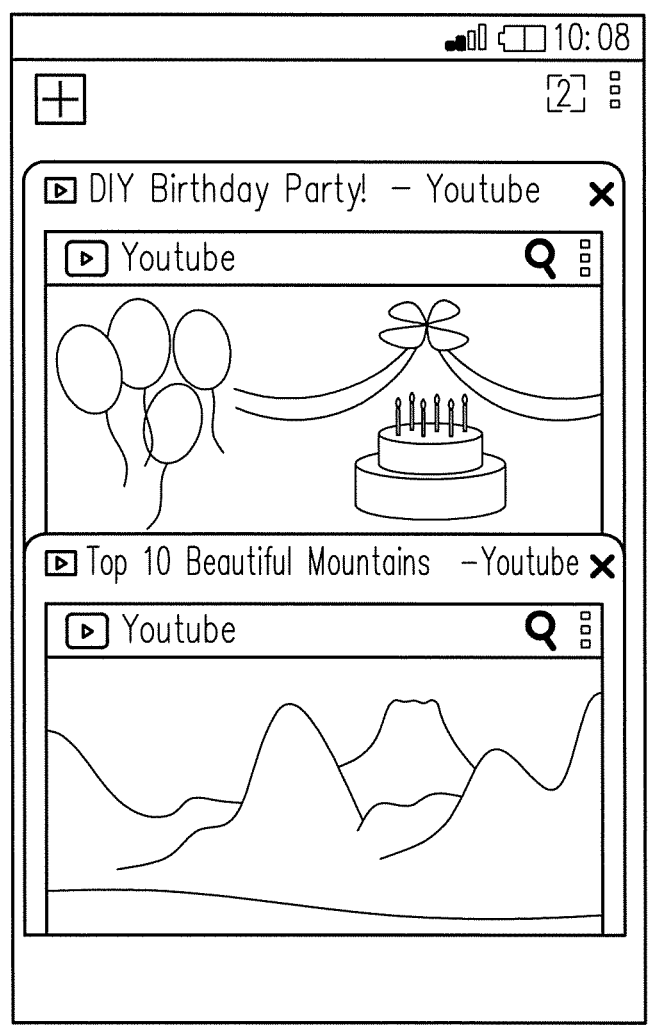
FIG. 1 illustrates an example of two playback sessions displayed on an electronic device.

Reference will now be made in detail to the present exemplary embodiments of the disclosure, examples of which are illustrated in the accompanying drawings. Wherever possible, the same reference numbers are used in the drawings and the description to refer to the same or like parts.

As described previously, in general when multiple playback sessions are opened simultaneously and displayed on a browser of an electronic device, only one of the playback sessions would be displayed in the foreground of display. Other playback sessions could be switched to the background of the display and would stop streaming. However, a user may prefer an experience more closely resemble a linear TV. Also, the playback session switched to the background may continue to download and perform pre loading or pre-buffering which, without intentional optimization, may result in hardware resources being wasted. If the network bandwidth does not allow multiple streams to be downloaded simultaneously, a scheduler which does not take the factor of whether a tab is active or inactive into account may cause the buffer of the active tab to underflow. Moreover, such scheduler may prevent the active tab from getting the best (visual) quality which is often accomplished by downloading the contents associated with the playback session with the highest bitrate, since bandwidth resources has been needlessly spent in download playback sessions of inactive tabs. Therefore, the disclosure provides a method and a device to address these issues.

It is worth noting that for this disclosure, the foreground of display could be a foreground window, a foreground frame, or a foreground tab, whereas the background of the display could be a background window, a background frame, or a background tab. The foreground tab is synonymous with phrase "active tab". When a playback session is being shown in the foreground, the foreground could be displayed in the form of a frame, a window, or a tab, and most or all of which could be completely visible. When a playback session is switched to the background, the background could be in the form of a frame, a window, or a tab. In the event that the background is a shown as a frame or a window, the background would generally be partially invisible. When the background is in the form of a tab, the background would generally be completely invisible. The playback session in the background tab of the display is synonymous with the phrase "inactive tabs".

When a power-saving mode is selected, for the inactive tabs, a more reasonable way to process the streaming contents of these inactive tabs is to download a representation of a lowest bitrate of the playback session of these inactive tabs with minimal pre-buffering. It is noted that a representation could be one of different levels of data units defined in MPEG-DASH. Pre-load or pre-buffer refers to the mechanism of buffering some data ahead of the current playback session so as to provide a satisfactory viewing experience when the user switches between tabs. The playback session of the active tab would be considered to have a higher priority than the playback session(s) in non-active tabs when downloading. Playback session(s) in inactive tabs would download (or pre-buffer or pre-load) under the condition that there are sufficient resources to buffer playback session of the active tab. This would make sense since the playback session of the active tab is immediately perceivable to the user.

To achieve the above stated effect, the disclosure proposes a playback method. The playback method may involve a pseudo playback mechanism which allows several playback sessions to be opened in order to download and display streaming contents on a resource-limited device. The pseudo playback mechanism aims to emulate the experience of watching a linear TV by which several programs are being downloaded simultaneously, and the audience could switch between the streaming contents based on their own will. The playback method may also include a mechanism of smart bitrate adaptation. The mechanism of smart bitrate adaptation would perform scheduling in a way that reduces unnecessary bandwidth and power consumption. Also, the mechanism of smart bitrate adaptation would improve the quality of the active session in the foreground.

Figure 2A:
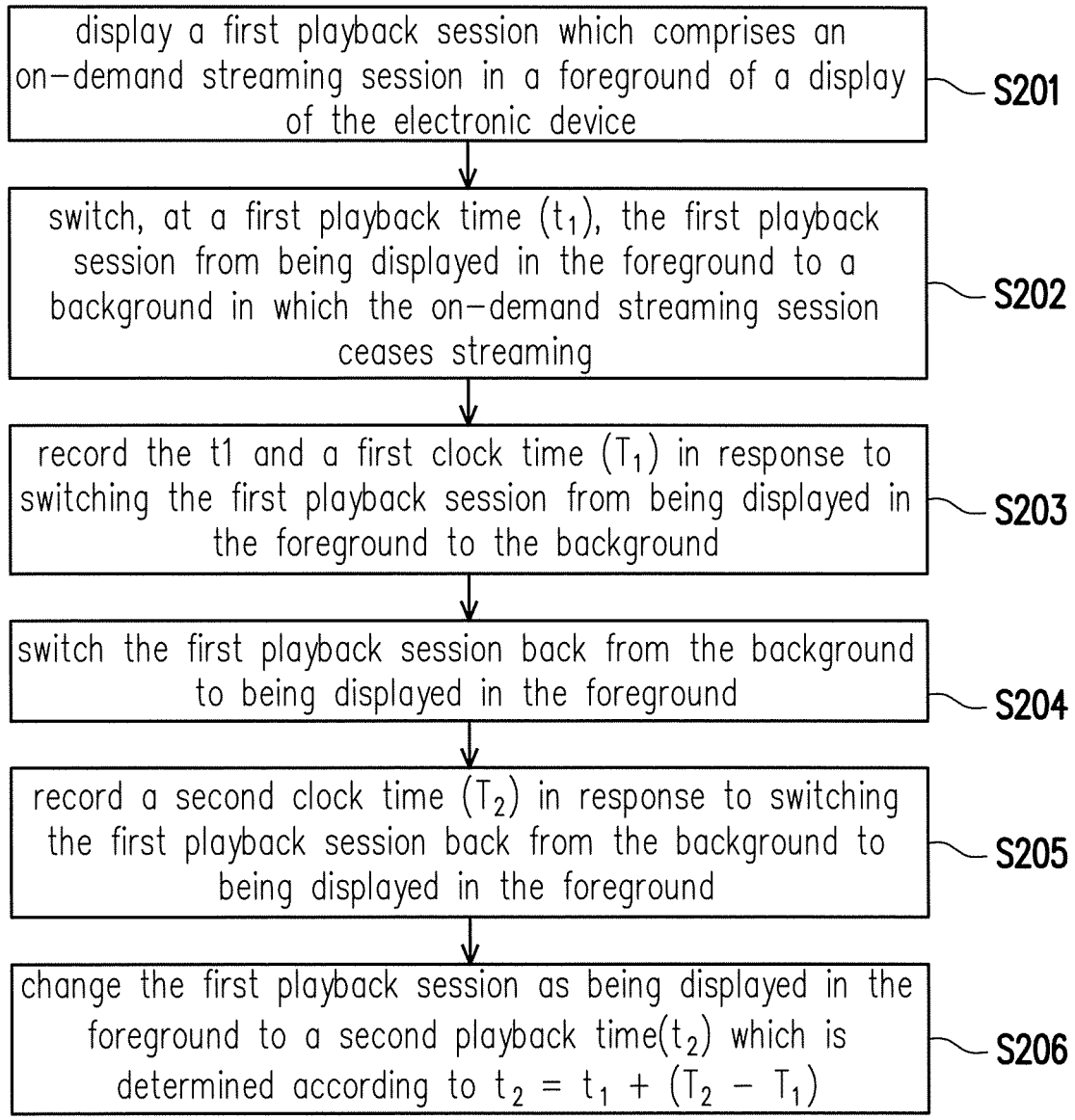
FIG. 2A illustrates a playback method which involves a pseudo playback mechanism used by an electronic device in accordance with one of the exemplary embodiments of the disclosure.

FIG. 2A illustrates a playback method which involves a pseudo playback mechanism used by an electronic device in accordance with one of the exemplary embodiments of the disclosure. In step S201, the electronic device would display a first playback session which comprises an on-demand streaming session in a foreground of a display of the electronic device. In step S202, the electronic device would switch, at a first playback time ($t_1$), the first playback session from being displayed in the foreground to a background in which the on-demand streaming session ceases streaming. In step S203, the electronic device would record the first playback time ($t_1$) and a first clock time ($T_1$) in response to switching the first playback session from being displayed in the foreground to the background. In step S204, the electronic device would switch the first playback session back from the background to being displayed in the foreground. In step S205, the electronic device would record a second clock time ($T_2$) in response to switching the first playback session back from the background to being displayed in the foreground. In step S206, the electronic device would change the on-demand streaming session as being displayed in the foreground to a second playback time ($t_2$) which is determined according to $t_2=t_1+(T_2-T_1)$. Specific exemplary embodiments will be provided to further elucidate the above described steps.

Figure 2B:
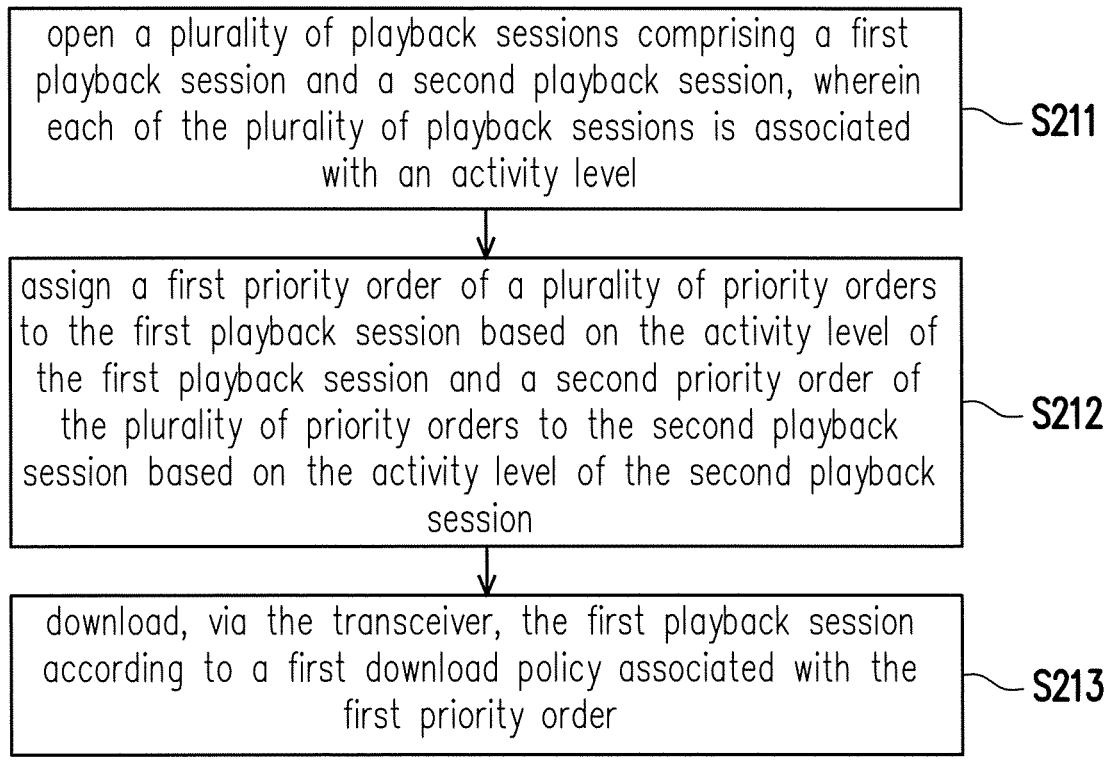
FIG. 2B illustrates a playback method which involves a smart bitrate adaptation mechanism used by an electronic device in accordance with another one of the exemplary embodiments of the disclosure.

FIG. 2B illustrates a playback method which involves as smart bitrate adaptation mechanism used by an electronic device in accordance with another one of the exemplary embodiments of the disclosure. In step S211, the electronic device would open a plurality of playback sessions comprising a first playback session and a second playback session, wherein each of the plurality of playback sessions is associated with an activity level. In step S212, the electronic device would assign a first priority order of a plurality of priority orders to the first playback session based on the activity level of the first playback session and a second priority order of the plurality of priority orders to the second playback session based on the activity level of the second playback session. In step S213, the electronic device would download, via the transceiver, the first playback session according to a first download policy associated with the first priority order. Specific exemplary embodiments will be provided to further elucidate the above described steps.

Figure 2C:
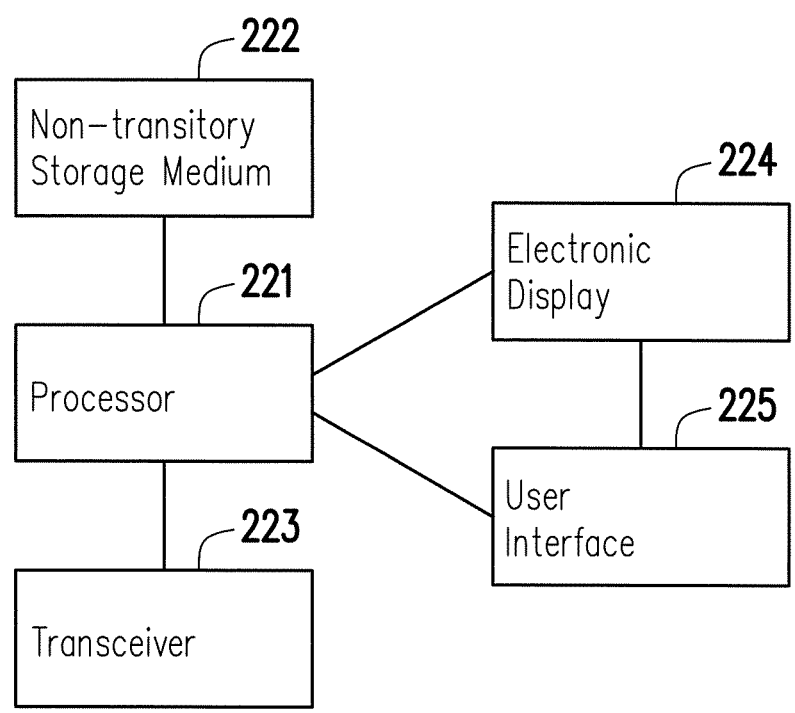
FIG. 2C illustrates the hardware of an electronic device in terms of functional block diagrams in accordance with one of the exemplary embodiments of the disclosure.

FIG. 2C illustrates the hardware of an electronic device in terms of functional block diagrams in accordance with one of the exemplary embodiments of the disclosure. The exemplary electronic device may include not limited to a processor 221 electrically connected to a non-transitory storage medium 222, a transceiver 223, an electronic display 224, and a user interface (UI) 225. The non-transitory storage medium may include one or more sets of volatile (e.g. random-access memory (RAM)) or non-volatile hardware memory (e.g. flash memory, read only memory (ROM), hard disk drive (HDD), and etc.) for providing temporarily or permanent storage of data and programming codes. The transceiver 223 may include one or more sets of transmitters and receivers for transmitting and receiving data through a wired transmission channel or a wireless transmission channel. The electronic display 224 could be a touch screen or any form of monitor which shows contents of playback sessions to a user. The UI 225 may include a touch sensor on the touch screen, hardware keyboard, hardware buttons and wheels, and other forms of input/output (IOs) interface for receiving input from and/or providing feedbacks to the user. The processor 221 may load programming instructions from the storage medium 222 and interact with other hardware components to implement the playback method as described in FIG. 2A, FIG. 2B, and exemplary embodiments to be described herein. The electronic device of FIG. 2C may be a mobile device or a computer (e.g., desktop computer or laptop computer).

Figure 3:
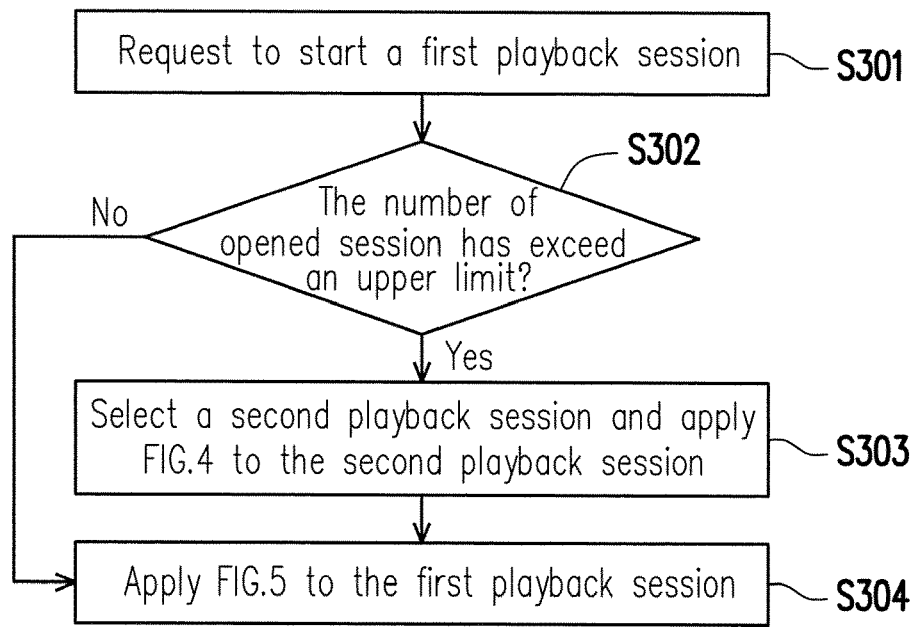
FIG. 3 illustrates an overview of a playback method which involves the pseudo playback mechanism in accordance with one of the exemplary embodiments of the disclosure.

FIG. 3 is a flow chart which shows an overview of a playback method based on one of the exemplary embodiments of the disclosure. The method provided in FIG. 3 would be used by an electronic device, which may be a mobile device or a computer. In step S301, a request to start a first playback session is received. The request is for requesting to start displaying the first playback session in the foreground of the display of the electronic device. The first playback session is an on-demand streaming session. The first playback session at this point in time could be a new playback session or could be among a plurality of playback sessions that are already opened. The request to start the first playback session could be received through the display 224 or the UI 225 of the electronic device. In step S302, the processor 221 may determine whether the number of session(s) opened in the foreground of the display has exceeded an upper limit which could be 1 or another non-zero positive integer as long as the upper limit is supported by the electronic device. If the upper limit has been exceeded, steps S303 and S304 will be executed. If the upper limit has not been exceeded, after step S302, the overall procedure would skip step S303 and would instead continue in step S304. In step S303, based on that the request to open the first playback session has been received, the processor 221 would select a second playback session and execute the process of FIG. 4 for the second playback session of FIG. 3. The second playback session is an on-demand streaming session and is already opened in the foreground of the display while requesting to start the first playback session. In step S304, the process of FIG. 5 would be applied to the first playback session of FIG. 3.

Figure 4:
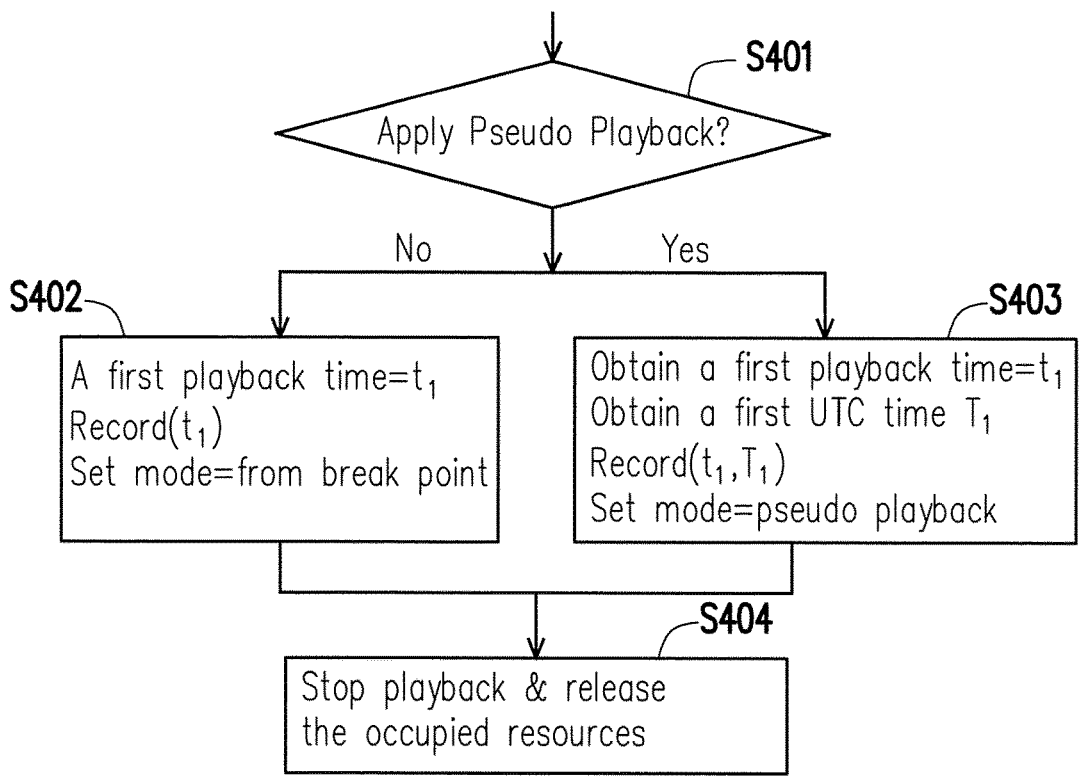
FIG. 4 illustrates a playback method which involves the pseudo playback mechanism in accordance with one of the exemplary embodiments of the disclosure.

FIG. 4 illustrates a playback method which involves the pseudo playback mechanism in accordance with one of the exemplary embodiments of the disclosure. In FIG. 4, it is assumed that the opened playback session(s) in the foreground of the display has exceeded the upper limit and the second playback session has been selected. In step S401, the processor 221 would determine whether to apply pseudo playback which could be set based on a default setting or as a user setting. If pseudo playback is to be applied to the second playback session, in step S403, the processor 221 would obtain a first playback time, $t_1$, and record the first playback time in a database which may be in the storage medium 222 or another storage medium independent from the storage medium 222 for the second playback session. The first playback time $t_1$ could be a time stamp which corresponds to the location in which the second playback session has progressed (e.g. 10 minutes and 30 seconds of the movie, 00:10:30). The processor 221 would then obtain a reference clock time (such as UTC time), $T_1$, and record the reference clock time in the database. The reference clock time $T_1$ could be current time of the day. It is noted that any selected playback session that the process of FIG. 4 is applied to may have its own first playback time $t_1$ and reference clock time $T_1$. The processor 221 would also set a playback mode flag to 'pseudo playback' mode. If pseudo playback is not to be applied, in step S402, the processor 221 would simply record the first playback time $t_1$ only in the database and set the playback mode flag to 'from break point'. In step S404, the second playback session is stopped (i.e., stopped being displayed in the foreground and switched to the background) and the occupied resources allocated for the second playback session are released (e.g. buffered contents are erased), by the processor 221. Since available resources have been freed, at this point the first playback session could be launched and displayed in the foreground.

In one embodiment, releasing resources allocated for the second playback session includes to download, via the transceiver 223, the second playback session of a low quality for the purpose of insuring seamless transition in response to switching the second playback session back from being displayed in the foreground to the background. In another embodiment, releasing resources allocated for the second playback session includes adjusting a download bitrate of the second playback session to a minimum bitrate so as to insure seamless transition in response to switching the second playback session back from being displayed in the foreground to the background. In still another embodiment, releasing resources allocated for the second playback session includes lowering a decoding rate of the second playback session in response to switching the second playback session back from being displayed in the foreground to the background. The aforementioned decoding rate may include zero.

Figure 5:
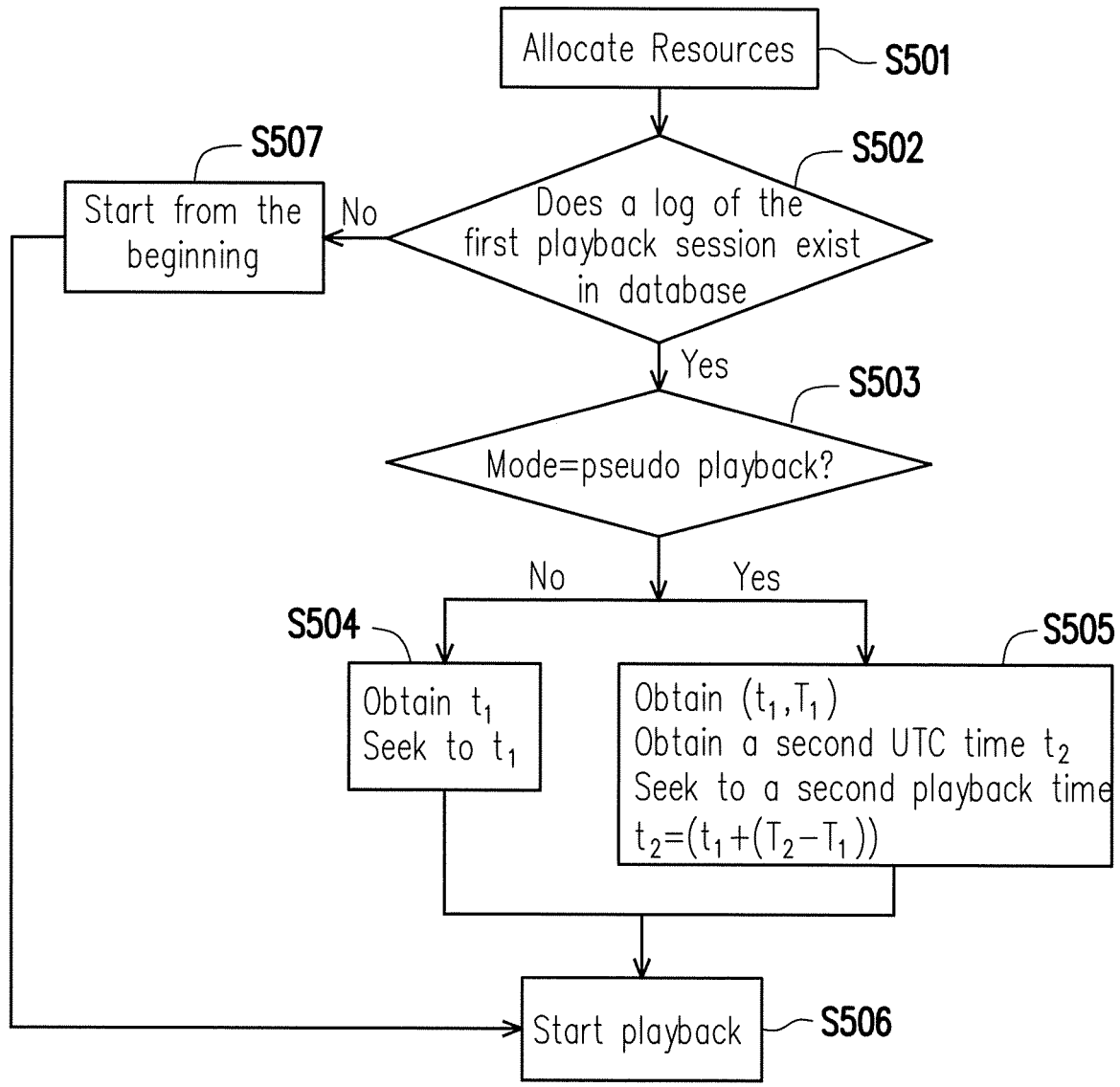
FIG. 5 illustrates a playback method which involves the pseudo playback mechanism in accordance with one of the exemplary embodiments of the disclosure.

FIG. 5 illustrates a playback method which involves the pseudo playback mechanism in accordance with one of the exemplary embodiments of the disclosure. In step S501, the electronic device would allocate the necessary resources to facilitate the streaming of the first playback session. Contents of the first playback session and the second playback session are assumed to be procured from a hosting server through the Internet, but contents of the first playback session and the second playback session may also be hosted within a personal area network (PAN) or a virtual private network (VPN). In step S502, after acquiring the necessary resources, the processor 201 may determine whether the first playback session has a log recorded within a database associated with the first playback session. If such log does not exist, then in step S507, the first playback session will be launched in a browser and played back from the very beginning of the streaming content. If such log does exist, then in step S503, the processor 221 would determine whether the playback mode flag was previously set as pseudo playback mode.

If the pseudo playback mode was not applied previously, then in step S504, the processor 221 would obtain the first playback time $t_1$ and perform a seek of the first playback session to the first playback time $t_1$ in order to restart the first playback session at $t_1$ which was the time stamp when the first playback session was previously switched to the background.

If the pseudo playback mode was applied previously, then in step S505, the processor 221 would obtain the first playback time $t_1$ of the first playback session and the reference clock time $T_1$ of the first playback session from the database, and the processor 221 would obtain a second reference clock time $T_2$ which could be a UTC time or a current time of the day. The processor 221 would then calculate the second playback time $t_2$, the target playback time from which the first playback session is to be played from. The processor 221 would calculate the second playback time $t_2$ according to $t_2=(t_1+(T_2-T_1))$ (Equation 1). Subsequently, the processor 221 would seek to the second playback time $t_2$ in order to play the first playback session at $t_2$. Thus, the first playback session as being displayed in the foreground would be played at the time of $t_2$. As the formula (Equation 1) implies, the effect of the pseudo playback is as if the first playback session which was previously stopped in order to switch to the second playback session is still being played in the background even though another playback session (e.g. second playback session) is being played at foreground. By implementing such pseudo playback mode, it would appear to the user as though the mechanism of the linear TV is feasible for playing on-demand streaming sessions on the electronic device.

The pseudo playback mechanism would function well especially for adaptive streaming (e.g. MPEG-DASH, Microsoft Smooth Streaming, HTTP live streaming). One of the reasons being that for adaptive streaming, a movie is split into small segments with different bitrate, and thus each playback session could be switch back and forth seamlessly. Most of modern codecs could be equipped with such ability. Also, all movies hosted by the same content provider would often have the same digital format. For example, the movies of YouTube are usually compressed in VP9 or H264, the container is fragmented MP4 and with the profile of urn: mpeg:dash:profile:isoff-on-demand:2011 of MPEG-DASH. Therefore, it would make little or no difference for codec to transfer from a current segment of a streaming content of a first movie to another segment of the streaming content of a second movie.

Figure 6:
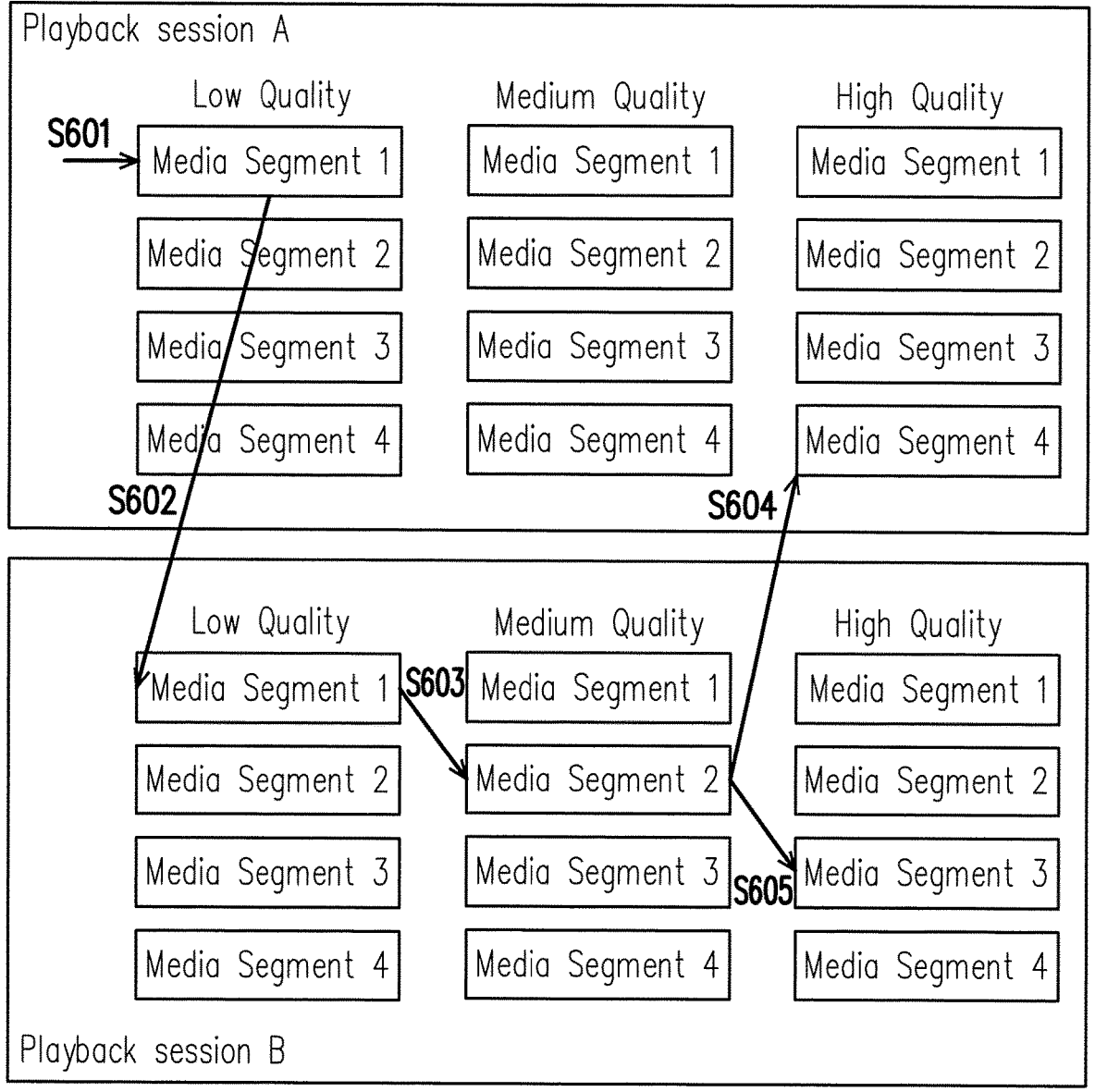
FIG. 6 illustrates an example of using the proposed playback method which involves the pseudo playback mechanism in accordance with one of the exemplary embodiments of the disclosure.

FIG. 6 illustrates an example of the proposed playback method which involves the pseudo playback mechanism in accordance with one of the exemplary embodiments of the disclosure. For the exemplary embodiment of FIG. 6, it is assumed that a user can switch among multiple playback sessions including a playback session A (which is a role of the first playback session recited in the process of FIG. 2A, or the second playback session recited in the process of FIG. 3) and a playback session B (which is a role of the second playback session recited in the process of FIG. 2A, or the first playback session recited in the process of FIG. 3). Each of the multiple playback sessions can be downloaded under different quality standards including low quality, medium quality, high quality, and etc. It is also assumed that each playback session is opened in a browser and each playback session has been stored as multiple media segments such as media segment 1, media segment 2, media segment 3, media segment 4, and so forth. Each of the media segments is assumed to be a 3 seconds long video and could be downloaded in the same or different quality standards. The length of each of the media segments associated with playback session A and playback session B could be adjustable but is assumed to be uniform if the playback session A and the playback session B are provided by the same content provider.

Referring to FIG. 6, in step S601, the playback session A is opened in the foreground, and the media segment 1 of the playback session A is being streamed and displayed. In step S602, the user of the electronic device switches the playback session A in favor of the playback session B. By doing so, the playback session A is switched to the background while the playback session B is switched to the foreground. After switching to the playback session B, the pseudo playback mechanism is assumed to be applied, and a first playback time ($t_1$) 00:00:03 (3 seconds) is recorded as well as a reference clock time ($T_1$) which could be the real clock time at which the switch to the playback session B has transpired. Subsequently, after step S602, media segment 1 of the playback session B is assumed to be played. In step S603, media segment 2 of the playback session B is played, and thus the 6 seconds have passed by for the playback session B, and approximately 9 seconds have passed by since the beginning of step S601.

If the user keeps watching the playback session B, in step S605 the media segment 3 of the playback session B would be fetched next. However, if the user switches back to the playback session A, then a second reference clock time, $T_2$, will be recorded. Instead of playing the playback session A at the location where the user previously left off (i.e. the first playback time $t_1$), the playback session A is assumed to be ongoing in a manner similar to linear TV. The processor 221 would then change the playback time of the playback session A to the location which corresponds to a second playback time $t_2$. The second playback time $t_2$ would be calculated according to $t_2=t_1+(T_2-T_1)$. Since $t_1$ is 3 seconds and $(T_2-T_1)$ is approximately the duration during which media segment 1 and media segment 2 of the playback session B have been played, 6 seconds, then $t_2$ is 9 seconds which translate to the start time of the media segment 4 of the playback session A. Consequently, the processor 221 may fetch the high quality movie header associated with the playback session A as well as the bit-stream from media segment 4 of the playback session A so as to transfer to the playback session A seamlessly. By doing so, the playback session A will be displayed in the foreground whereas the playback session B will be switched to the background. The playback session B could no longer be visible if the playback session B exists as a background tab. The playback session B could no longer be visible or partially invisible if the playback session B exists as a background window or a background frame.

Figure 7:
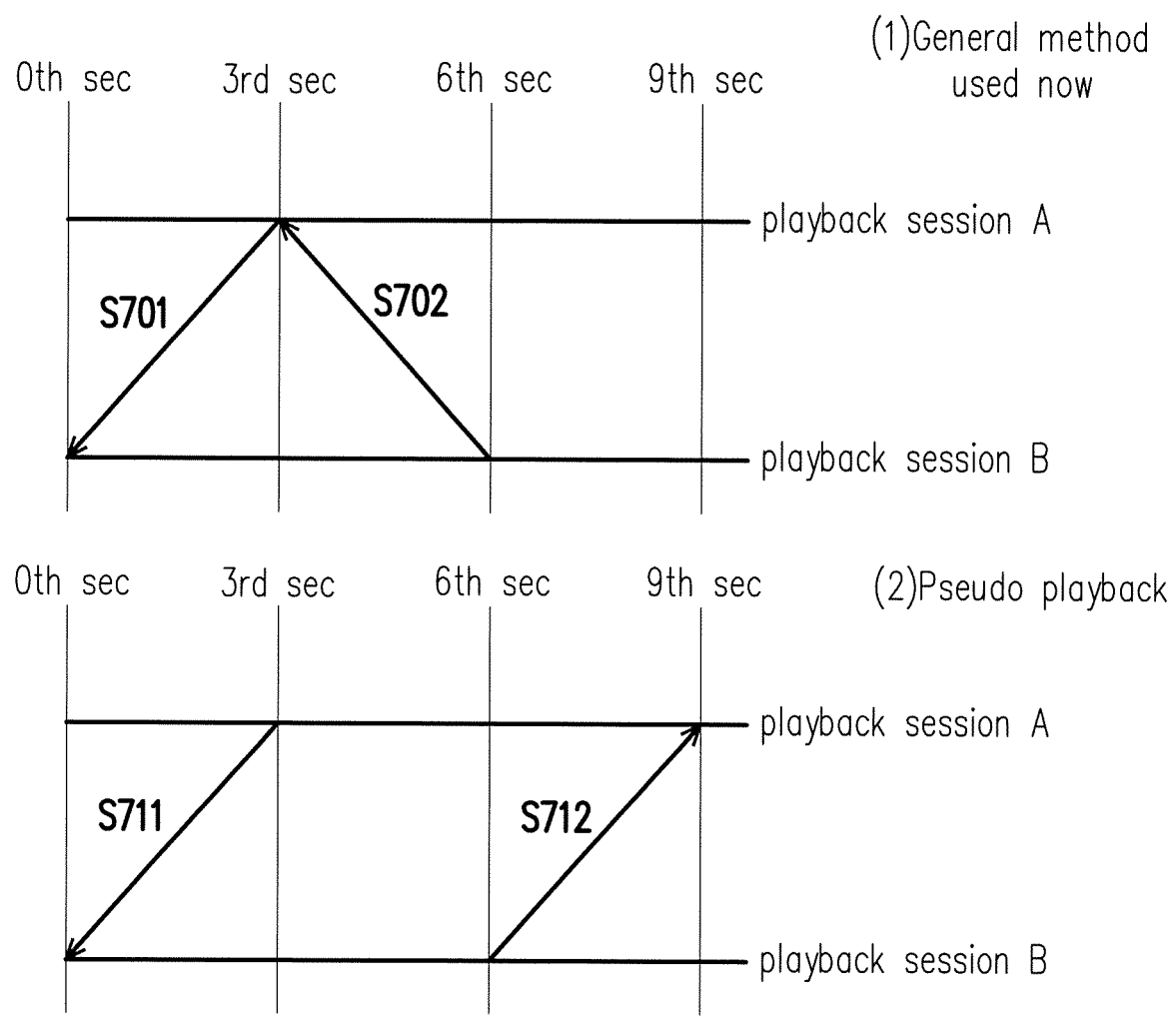
FIG. 7 illustrates an example of differences between a normal playback mechanism and the pseudo playback mechanism in accordance with one of the exemplary embodiments of the disclosure.

FIG. 7 illustrates an example of differences between a normal playback mechanism and the pseudo playback mechanism in accordance with one of the exemplary embodiments of the disclosure. In FIG. 7 the top figure labeled (1) is an example of a normal playback mechanism and the bottom figure labeled (2) is an example of the pseudo playback mechanism. Referring to FIG. 7, assuming that a playback session A has been played for 3 seconds after which, in step S701, the user switches from the playback session A to instead display a playback session B. Since the playback session B has not been watched already, the playback session B will show the streaming content from the beginning. After displaying 6 seconds of the playback session B, in step S702 it is assumed that the user switches from the playback session B back to the playback session A. Under the normal playback mechanism, the playback session A would resume from the 3rd second of the playback session A. The 3rd second would be the location where the user previously left off.

In contrast to the normal playback mechanism, the pseudo playback mechanism would allow a user to believe that the playback session A is still ongoing while the playback session B is playing. Assuming that a playback session A has been played for 3 seconds after which, in step S711, the user switches from the playback session A to instead display a playback session B from the beginning. After displaying 6 seconds of the playback session B, in step S712 it is assumed that the user switches from the playback session B back to the playback session A. Under the pseudo playback mechanism, when the playback session A is returned, it starts from the 9th second of the playback session A as if the playback session A were still ongoing while the playback session B was played. In actuality, the playback session A is skipped ahead by counting time so that no waste of real resources would have been incurred. In addition, seamless transitions could be accomplished by transitioning between different small segments of streaming contents. Even if the segments are not aligned neatly, each playback session may seek to the middle of a segment. But since the duration of a segment's range is only about several seconds, it would be easy to skip the beginning of a segment and instead seek to the middle of the segment.

Under the above described pseudo playback mechanism, on-demand streaming contents can be viewed as a traditional linear TV. A user could be allowed to open multiple streaming contents at the same time even on an electronic device which provides at most just one way of decoding. Unless a user pauses a video based on one's own volition, the programs in the background such as in inactive tabs or invisible or partially visible windows or frames would seem to keep on playing, from the user's perspective.

When a user plays back an on-demand streaming session on an electronic device with limited computational ability and with limited instances of playback sessions that can be opened, the electronic device may surpass the limit by emulating playback sessions that are switched to the background. If the playback session A becomes inactive by running in the background and the playback session B becomes active by switching back the playback session B to the foreground, then the electronic device would perform a series of steps described as follows. The processor 221 would record the current playback time $t_1$ which the timestamp of the location where the playback session A has left off and also record a first reference clock time $T_1$. The processor 221 may release the resources which are needed in launching the playback session A and with mutually exclusive properties. The processor 221 would set the download task associated with the playback session A within the scheduling task queue to low priority. Assuming that the playback session A is returned to be active, the processor 221 would obtain calculate the time elapsed from this point in time (i.e. a second reference clock time $T_2$) to the previously recorded first reference clock time ($T_1$). The processor 221 would perform a forward seek to a second playback time $t_2$ of the playback session A based on $t_2 = t_1 + (T_2 - T_1)$. The processor 221 would then restore the download tasks associated with the playback session A within the scheduling task queue to high priority.

The proposed pseudo playback mechanism would allow users to open several playback sessions at the same time. For a playback session, unless the user pauses the current playback session and switch to another playback session, the pseudo playback mechanism is generally applied to playback sessions that are running at the background. Thus, the electronic device appears to provide the same user experience as a linear TV for watching on-demand streaming multimedia contents. To open a new playback session, close an old playback session, or switch to another playback session from a current playback session may be controlled by different gestures of the user.

Figure 8:
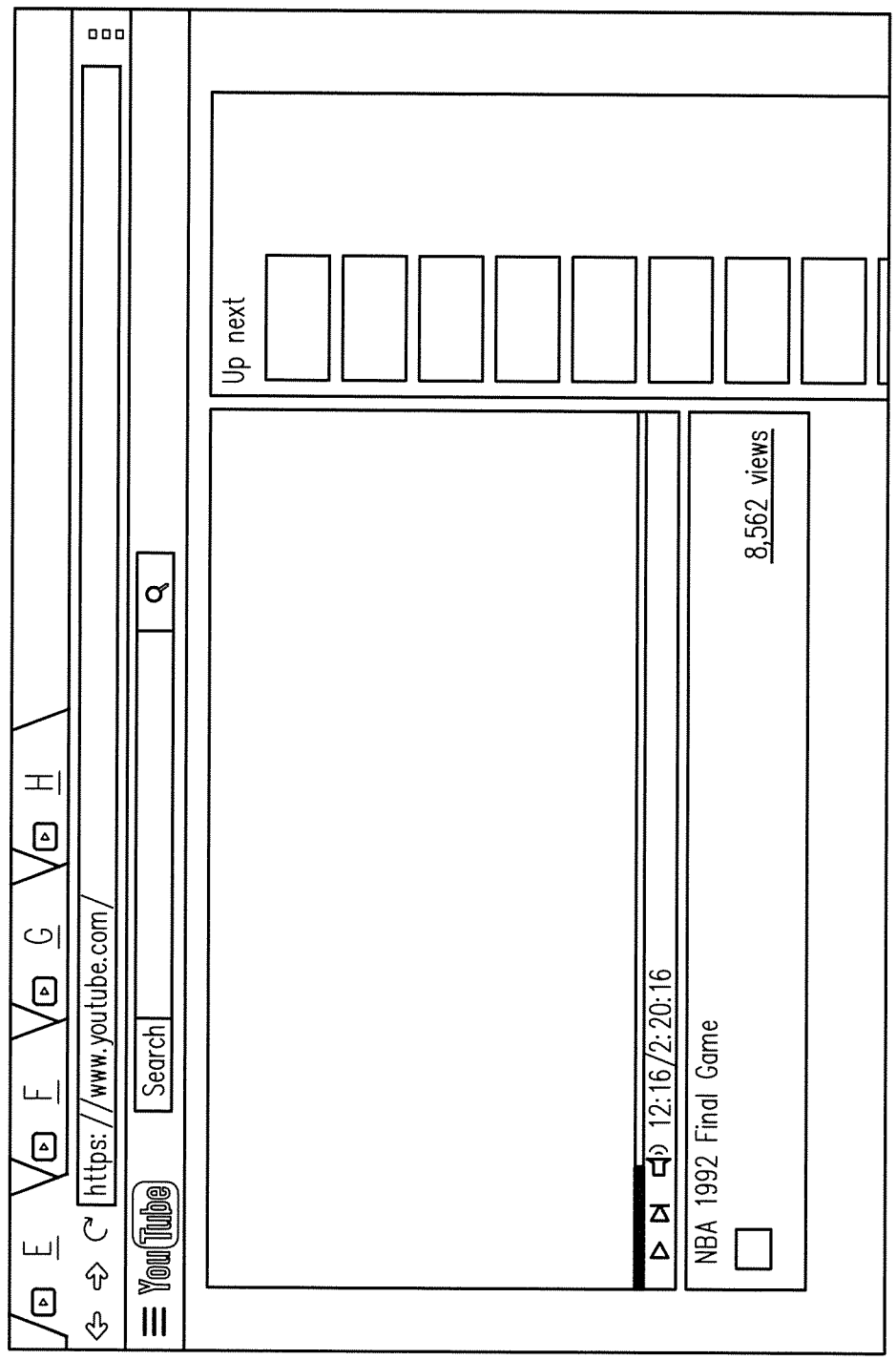
FIG. 8 illustrates an example of using smart bitrate adaptation in accordance with one of the exemplary embodiments of the disclosure.

FIG. 8 illustrates an example of using a smart bitrates adaptation mechanism in accordance with one of the exemplary embodiments of the disclosure. The concept of smart bitrates adaptation is to be explained by using the example of FIG. 8 which shows an opened browser. The top of the browser contains several tabs (or pages) being opened, such as 4 tabs remarked as E, F, G, and H, and each of the tabs may contain a link to a streaming source such as YouTube. Since only one of the tabs is visible (active tab, such as tab E in FIG. 8) at a time, when bit streams are scheduled for downloads, to download the playback session associated with the visible tab would be granted with the highest priority. By doing so, the user would be provided with the best visual experience. Under the proposed smart bitrates adaptation scheme, (only) when the visible playback session (active tab) has sufficient data in its buffer to provide the user with the best visual experience, other playback sessions associated with invisible tabs (such as tabs F, G, H in FIG. 8) could then perform downloads assuming that there are sufficient bandwidths left over for downloads. Alternatively, if the bandwidths are distributed to invisible playback sessions instead, the display quality (i.e., resolution) of the playback session of the active tab may suffer since it could not fully utilize the available network bandwidths. In this way, the electronic device may need to downgrade to download a lower bitrate (i.e., a lower quality) segments of the playback session for the active tab.

The same concept would also apply if the playback sessions are opened in foreground or background windows/frames instead of tabs. For subsequent disclosure, a playback session opened in a foreground window is assumed to function in a similar manner as a playback session opened in an active tab, and a playback session opened in a background window is assumed to function in a similar manner as a playback session opened in an inactive tab. A playback session in a background tab would generally be completely invisible, whereas a playback session switched to a background window would either be completely invisible or partially invisible.

Figure 9:
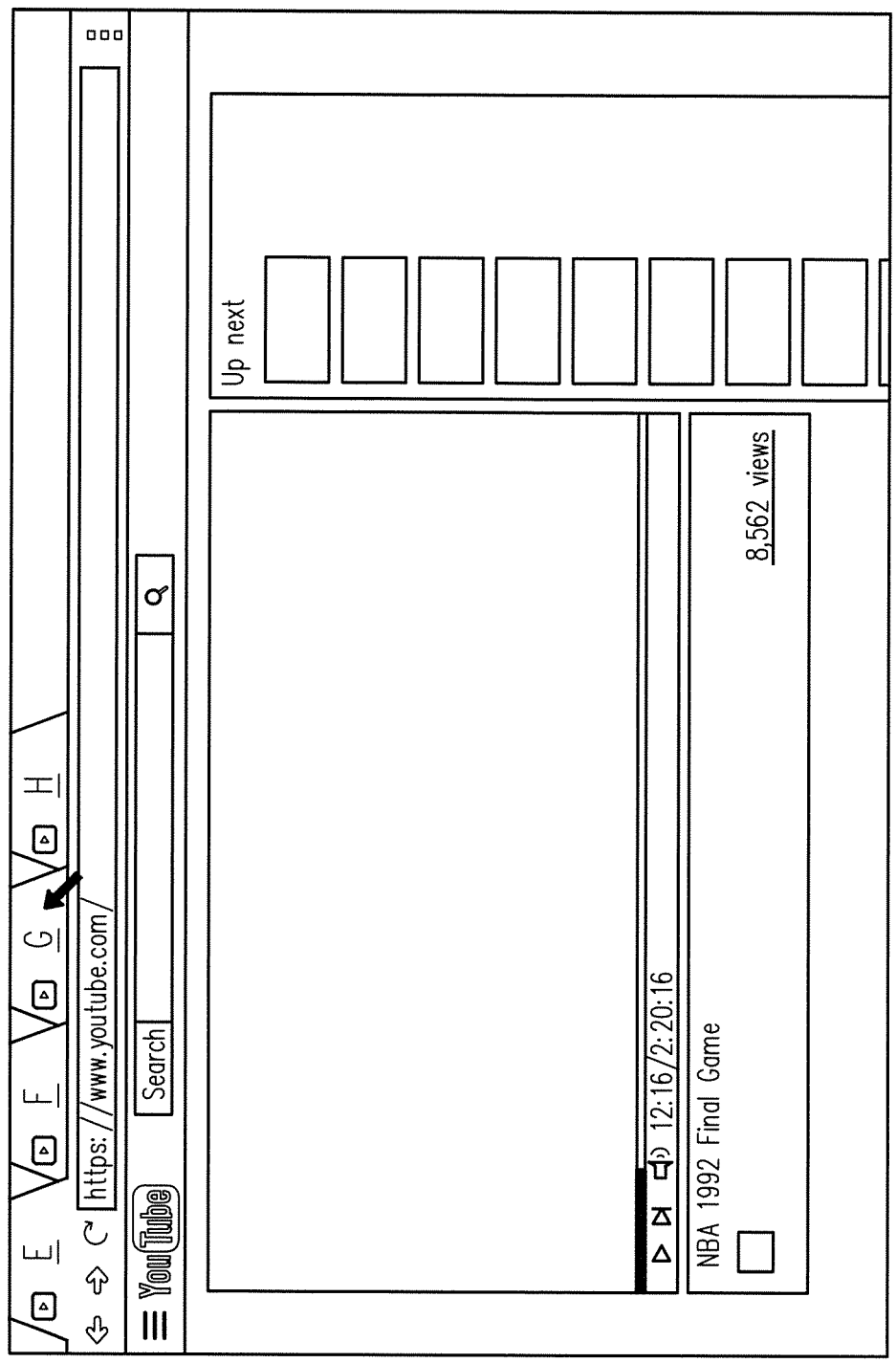
FIG. 9 illustrates an example of opening multiple tabs in accordance with one of the exemplary embodiments of the disclosure.

FIG. 9 illustrates an example of opening multiple tabs in accordance with one of the exemplary embodiments of the disclosure. Similar to FIG. 8, the top of the browser shows several tabs (or pages) being opened, such as 4 tabs remarked with E, F, G, and H. For the smart bitrates adaptation scheme, opened tabs could be roughly divided into 3 (but not limited to 3) groups or categories. The groups of tabs may be corresponding to a group of an active session (which is in an active tab or active page), a group of to-be-active session, and a group of inactive session(s) (in inactive tab(s) or active pages). For FIG. 9, the playback session which shows NBA 1992 Final Game is in the active tab E. The tab G, which the mouse pointer is pointing to but is not yet opened, is considered a to-be-active playback session. The remaining session(s) are considered inactive sessions(s), such as the sessions in the tabs F and H. According to the visibility (or activity) for the currently opened playback sessions, a priority queue could be implemented based on Table 4 below. Each of the entries of Table 4 is associated with a playback session of a different tab.

TABLE 4

| Active | To-be-active | Inactive | Inactive | Inactive | ... | ... |
|--------|--------------|----------|----------|----------|-----|-----|

The active tab has the highest priority, the to-be-active tab has the next highest priority, and inactive tabs have the lowest priority. This means that all system bandwidths will first be provided to download the playback session of the active tab which will provide the user with the best possible visual experience. If there is any bandwidth left over, the remaining bandwidth will be provided to download the playback session of the to-be-active tab. Lastly, if there is still yet any remaining bandwidth left over, the remaining bandwidth will be provided to download the playback session(s) of the inactive tab(s).

Figure 10:
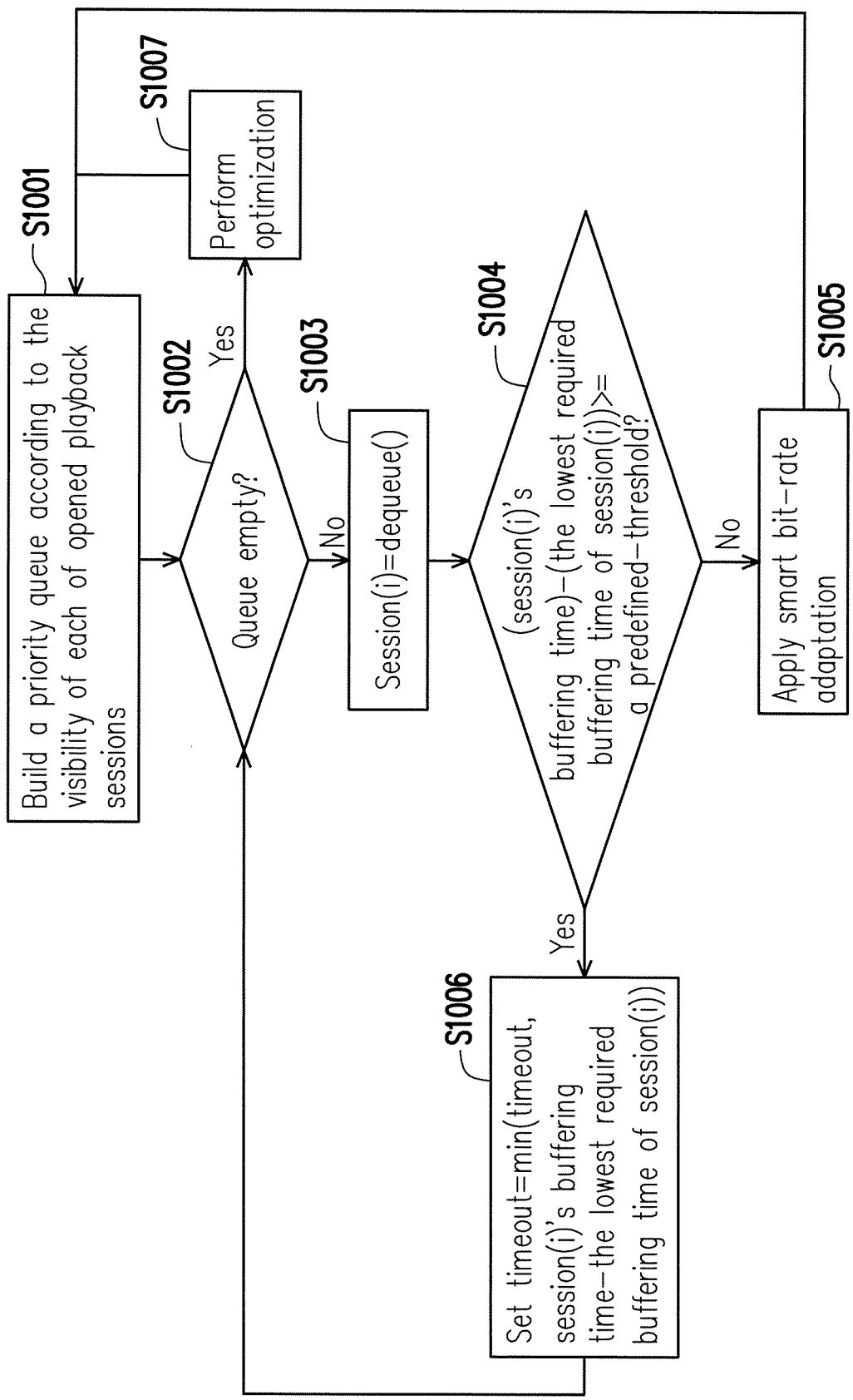
FIG. 10 illustrates a playback method which involves a smart bitrate adaptation technique in accordance with one of the exemplary embodiments of the disclosure.

FIG. 10 illustrates a playback method which involves a smart bitrate adaptation technique in accordance with one of the exemplary embodiments of the disclosure. In step S1001, a priority queue associated with opened playback sessions will be built according to the visibility of each of the opened playback sessions based on the above stated principle. The priority queue is a FIFO structure. For example, 4 playback sessions A (in an active tab), B (in a to-be active tab), C and D (in inactive tabs) are opened, and the priority queue is ABCD. After building the priority queue, in steps S1002, the processor 221 would determine whether the priority queue is empty. If the priority queue is not empty, then in step S1003, a playback session (i) will be removed from the priority queue (which is called dequeue in FIG. 10) to a further step. For a fully occupied priority queue having the playback sessions A, B, C, D as the above example, the playback session A is the first one removed from the priority queue. In step S1004, the processor 221 will determine whether the buffering time of the playback session (i) minus the lowest required buffering time of the playback session (i) is greater or equal to a predefine threshold, Th(i). If not, then in step S1005, the processor 221 would apply the smart bitrates adaptation which is a process illustrated in FIG. 11 and start the same process for remaining playback session(s) in the priority queue. If so, then in step S1006, the processor 221 will set a current timeout which is equal to the minimum of a previous timeout and a playback session (i)'s buffering time minus the lowest required buffering time of playback session (i). The timeout is set to infinity in the initial state of the process of FIG. 10. Afterwards, the procedure would proceed in step S1002. It is noted that the length of buffering time of the playback session (i) is related to the amount of buffering data of the playback session (i) stored in a buffer. For example, if the time length of each media segment of the playback session (i) is 3 seconds, the buffering time of 12 seconds would be equivalently 4 media segments. Back to step S1002, if the priority queue is empty (which means that all playback sessions have enough buffering data in the buffer), optimization could be performed in step S1007. An exemplary optimization may be to re-download the segments of higher quality for the playback sessions of lower priority in inactive tabs or to-be-active tab, to improve the quality of the playback sessions of lower priority.

Step S1004 and step S1006 are further illustrated by the following example. It is assumed that the time length of each media segment is 3 seconds; the lowest required buffering time of a playback session in the active tab is preconfigured to 10 seconds; the lowest required buffering time of a playback session in the to-be-active tab is preconfigured to 8 seconds; the lowest required buffering time of a playback session in the inactive tab is preconfigured to 4 seconds; and the predefine threshold Th(i) for the playback session in the active/to-be-active/inactive tabs is preconfigured to 3 seconds. Based on the above assumptions, if in the buffer there is buffering time 15 seconds (i.e. buffering data 5 segments) for the playback session A in the active tab, the result of step S1004 would be Yes (because (15 secs−10 secs)>3 secs) and the timeout equals min {∞, (15−10)}=5 seconds. This means the buffering data for the playback session A is enough and there is 5 seconds left to lack of buffering data.

Back to step S1002, the playback session B (in the to-be-active tab) is removed from the priority queue. If in the buffer there is buffering time 11 seconds (i.e. buffering data more than 3 segments) for the playback session B, the result of step S1004 would be Yes (because (11 secs−8 secs)=3 secs) and the timeout is updated to min {5, (11−8)}=3 seconds. This means the buffering data for the playback session B is enough and there is 3 seconds left to lack of buffering data. Then, back to step S1002 again, the playback session C (in the inactive tab) is removed from the priority queue. If in the buffer there is buffering time 5 seconds for the playback session C, the result of step S1004 would be No (because (5 secs−4 secs)<3 secs), which means the buffering time (or buffering data) for the playback session C is not enough. Thus, step S1005 (smart rate adaptation) is performed such that the electronic device may download more segments of the playback session C by using a corresponding downloading policy (which is introduced in FIG. 11).

On the other hand, if in the buffer there is buffering time 8.5 seconds for the playback session B, the result of step S1004 would be NO (because (8.5 secs−8 secs)<3 secs). This result means that the buffering data of the playback session B may soon run out. Hence, step S1005 is performed such that the electronic device may download more segments of the playback session B by using a downloading policy which corresponds to playback session B. It is noted that the lowest required buffering time of a playback session (whatever the priority it is) may be preconfigured to any proper value, including 0 sec. The predefine thresholds Th(i) for the playback sessions of different priority may be preconfigured to different values.

Essentially the concept of FIG. 10 is to check the priority queue sequentially in order to find out whether a playback session may have insufficient buffering time and to download more data for that playback session. In another exemplary embodiment, a threshold $Th_d(i)$ is set to represent the amount of buffering data. Once the buffering data is sufficient relative to the threshold $Th_d(i)$ for a playback session, then it likely means the playback session would be safe from underflow. Therefore, remaining resources could be given to the playback session having the next highest priority. The process will continue for each playback session until a playback session having less buffering data than its threshold $Th_d(i)$ has been found.

In another exemplary embodiment, once a playback session has been selected for download, different policies could be applied according to the priority of each playback session. For example, only a representation of the lowest bitrate for inactive (invisible) session could be downloaded. A representation could be one of different levels of data units defined in MEPG-DASH. For more aggressive power saving, downloads of inactive session could be stopped entirely, but a mere representation of the lowest bitrate for the active playback session and the to-be-active session could be downloaded. Finally, for those downloaded bitstreams of invisible playback sessions, before the download expires which could means that the time stamp of its presentation time has been out of date, the downloaded bit stream could be temporarily stored in a buffer instead of sending the downloaded bit stream to the decoder for decoding. In this way, unnecessary power consumption wasted in decoding could be spared. If the playback session has become visible again, the stored bit-stream and feeds from Instantaneous Decoder Refresh (IDR) frame (which is also called stream access point, SAP, as defined in ISO/IEC 23009-1) could be retrieved. Since adaptive streaming often has the first frame of a particular segment as an IDR frame, and each segment could range from several seconds. The transition time could be made to be within an acceptable range.

Figure 11:
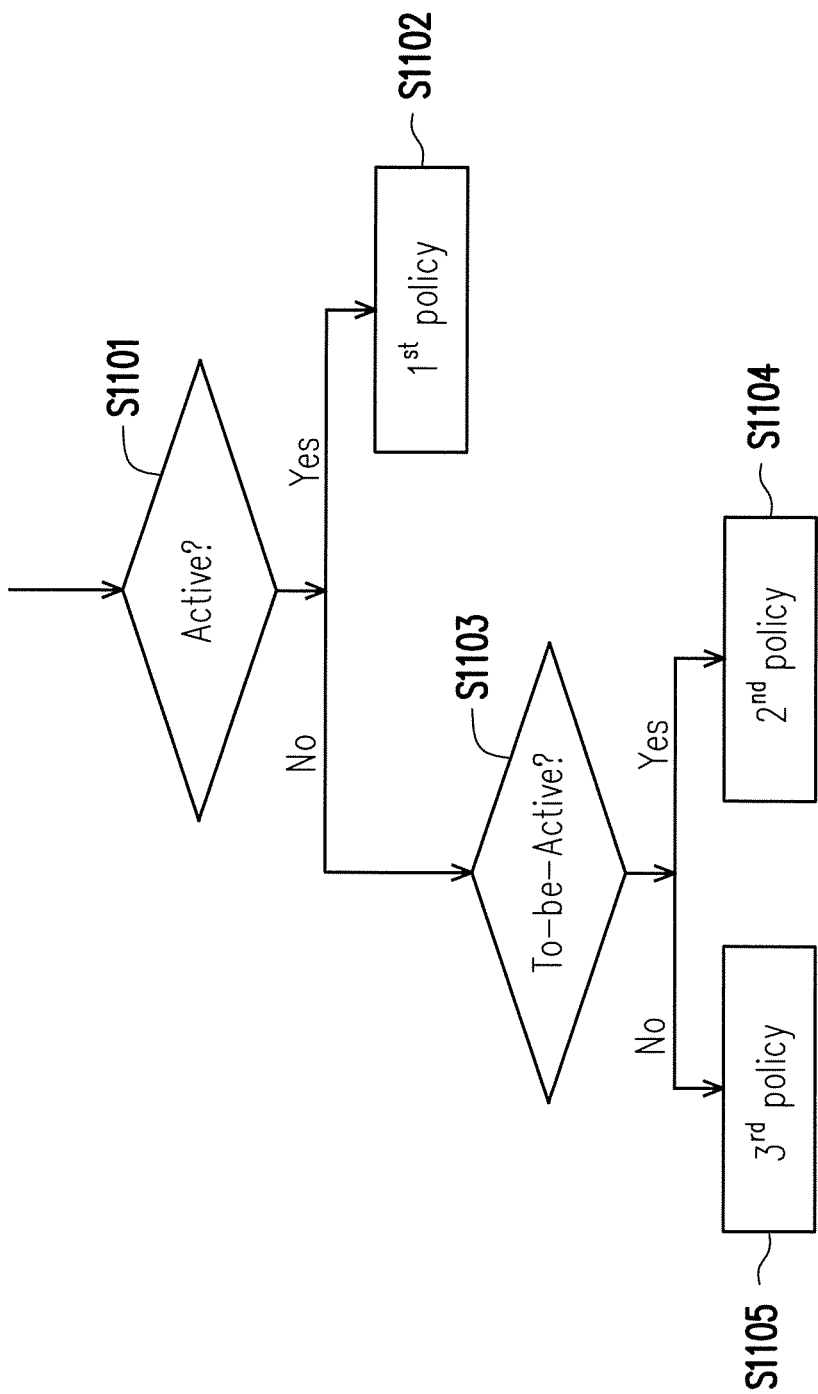
FIG. 11 illustrates a playback method which involves a smart bitrate adaptation technique based on different policies in accordance with one of the exemplary embodiments of the disclosure.

FIG. 11 illustrates a playback method which involves a smart bitrate adaptation technique based on different download policies in accordance with one of the exemplary embodiments of the disclosure. In step S1101, the processor 221 would determine whether a playback session is an active playback session (or in an active tab). If the playback session is an active playback session, then in step S1102, the playback session would be assigned with a first download policy. If the playback session is not active playback session, then in step S1103, the processor 221 would determine whether the playback session is a to-be-active playback session. If the playback session is a to-be-active playback session, then in step S1104 the playback session would be assigned with a second download policy. If the playback session is not a to-be-active playback session, then in step S1105 the playback session would be assigned with a third download policy. The first, second and third download policies associated with the video quality of the playback session to be downloaded. In general, a playback session with a higher priority would be granted a download policy which allows to download high-quality segments that consume more download bandwidth or time slot for downloads. This means that the first download policy would allow more download bandwidth or time slots for downloads than the second download policy. The second download policy would allow to download medium-quality segments that consume more download bandwidth or time slots for downloads than the third download policy. The download policies are not limited to be the above examples. Overall, the mechanism of smart bitrates adaptation would allow an electronic device to optimize downloads of multiple playback sessions, which would be opened in a window, a frame, or a tab. The smart bitrates adaptation scheme would divide multiple playback sessions into groups based on the activity level, e.g., whether one is active, to-be-active, or inactive. Next, a priority queue will be built according to what group each playback session would belong to. Different download policies are applied to different playback sessions based on their priorities. The playback session with higher priority will get more download bandwidth so as to obtain higher quality segments. However, if multiple sessions have the same priority, then a round robin scheduling could be applied.

Different alternatives could be applicable to the above described concept. In one exemplary embodiment, when a playback session is made invisible, the App or browser would stop downloading bit streams for the playback session. When the playback session is made invisible, the app or browser will automatically select and download the (video) representation of the lowest bitrate.

In one exemplary embodiment, when a playback session is made invisible, the app or browser will at most download the amount of bit streams which could insure seamless transition when the playback session is switched back to being visible. When the playback session is made invisible, the streaming content of the playback session would download but would not be decoded. In general, the electronic device would open several display windows to playback several streaming sessions. The electronic device would set priority for each download tasks according to whether the playback session is accessible/inaccessible or visible/invisible to the user. The playback session of the active (or visible) window or frame or tab has the highest priority for download. The playback session that is about to be visible (e.g. mouse pointer hovering upon) has the second highest priority for download. The remaining playback sessions have the lowest priority for downloads.

In one exemplary embodiment, when the audio of the playback session is not hearable, the app or browser will stop download the bit steams of the audio of the playback session. Alternatively, when the audio of the playback session is not hearable, the app or browser will automatically select and download the audio representation of the lowest bitrate. Alternative, when the audio of the playback session is not hearable, the app or browser will at most download the amount of bit streams which could insure seamless transition when the playback session is switched back to being hearable.

In one exemplary embodiment, when any other forms of media track(s) besides audio/video such as text tracks for subtitles of the playback session is not accessible or visible for the user, the app or browser will stop receiving the bit streams. Alternative, when any other forms of media track besides audio/video such as a text tracks for subtitles of the playback session is not accessible or visible for the user, the app or browser will automatically select & download the representation of the lowest bitrate.

In one exemplary embodiment, when a user plays a playback session with both the audio and the video but the video invisible (switch to the background), the app or the browser would report such event to the content provider which may insert suitable advertisement which is be presented purely with sound.

Figure 12:
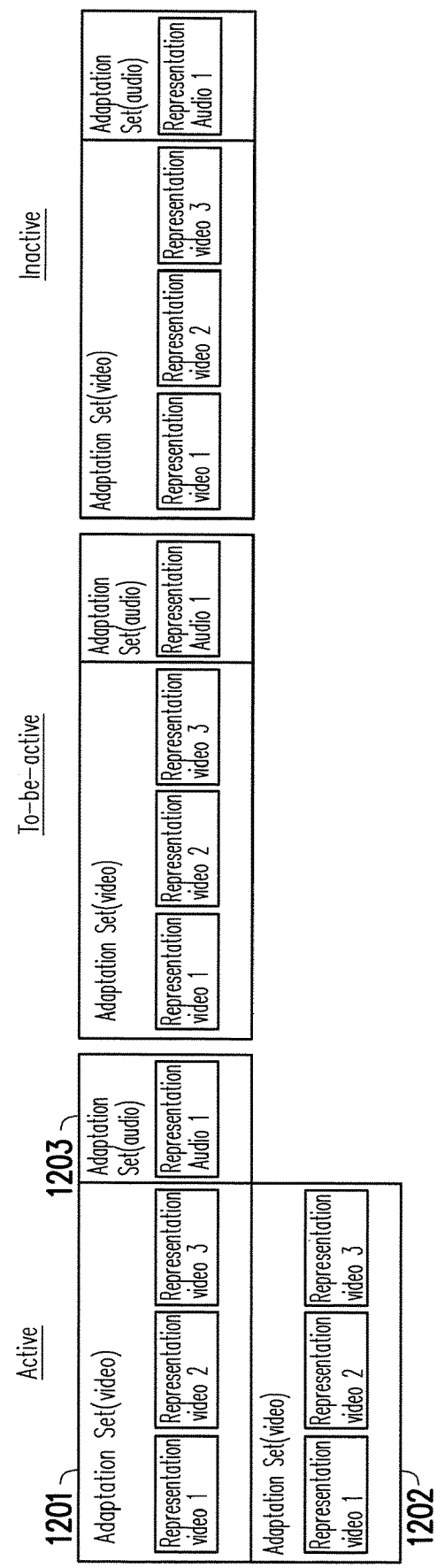
FIG. 12 illustrates a playback method in a multi-view virtual reality (VR) setting in accordance with one of the exemplary embodiments of the disclosure.

The above described inventive concepts could be extended to a multi-view virtual reality (VR) setting. FIG. 12 illustrates a proposed playback method in the multi-view virtual reality (VR) setting in accordance with one of the exemplary embodiments of the disclosure. The VR application may have a video content captured by different cameras in different view angles. For instance, the active playback session contains a video adaptation set 1201 of a first view angle, a video adaptation set 1202 of a second view angle, and an audio adaptation set 1203. Each video adaptation set includes one or more representations such as Representation video 1 to Representation video 3, and each representation includes one or more segments. Each audio adaptation set includes one or more representations such as Representation audio 1, and each representation includes one or more segments. Each representation of the video adaptation set relates to a respective quality, i.e., relates to a respective bitrate that the content provider uses to encode the streaming contents.

For example, in FIG. 12, Representation video 1 is generated in a low bitrate (so it may have the lowest resolution), Representation video 2 is generated in a medium bitrate, and Representation video 3 is generated in a high bitrate (so it may have the highest resolution). In the perspective of the electronic device which downloads the playback session, to use a specific download bitrate may mean to download a representation of a specific bitrate. In FIG. 12, the video adaptation sets 1201 and 1202 of the active playback session including Representation video 1 to Representation video 3 of all quality levels do not mean that the electronic device has to download all the representations but presents the possible presentations that can be selected to download. In FIG. 12, the electronic device may download a video representation selected from the video adaptation set of a view angle for the to-be-active playback session and there is no other video adaptation set of another view angle for the to-be-active playback session.

In some application scenarios, a playback session may have multiple audio and video tracks (e.g. adaptation set of MPEG-DASH). For example, a playback session may have multiple views or a multi-track or may support multi-language pronunciations embedded in a multi-track audio. If there is only one audio and video track at a time, under such circumstance, by switching to other audio and video tracks, the active playback session will stagnate because of the lack of buffering data. In order to solve this problem, the video adaptation sets of multiple view angles and the audio adaptation set of the active playback session would be assigned with a high priority or a download policy associated with a higher quality than the to-be-active playback session or inactive playback session. In such a condition, a scheduling may be applied to check buffer for respective playback sessions of different activity levels and is illustrated as follows.

First, the amount of buffering data of a primary (video or audio) adaptation set of the active playback session will need to be checked to see if the buffering data is sufficient or insufficient. If the buffering data of the primary adaptation set is sufficient, the processor would check the amount of buffering data of a secondary (video or audio) adaptation set of the active playback session even though the secondary adaptation set of the active playback session may be in an inactive state. In an example, only if all of the active and inactive adaptation sets of the active playback session have sufficient buffering data, the amount of buffering data of the adaptation sets of the to-be-active playback session or the inactive playback session may be checked.

Figure 13:
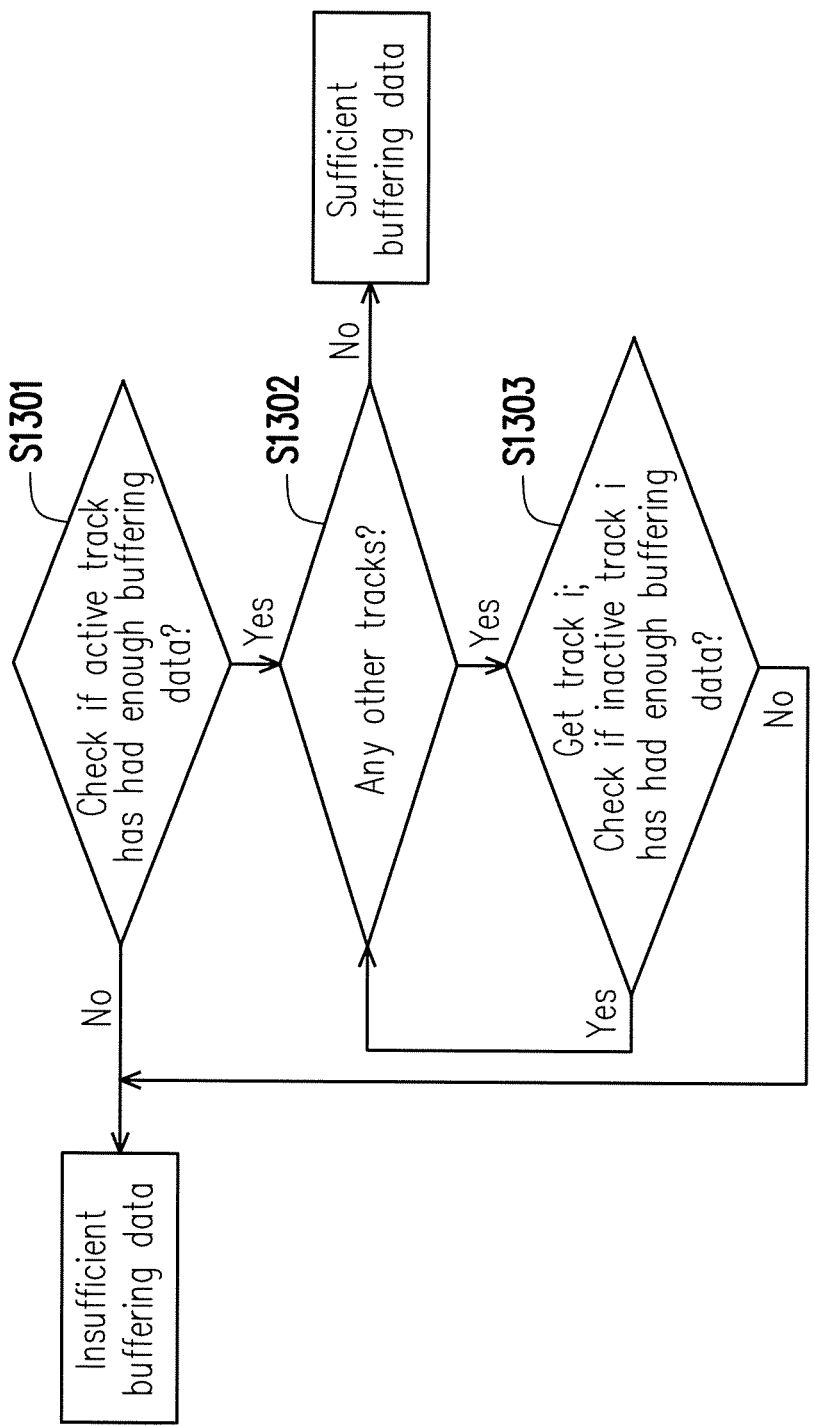
FIG. 13 illustrates a process of checking buffering data for the proposed playback method in accordance with one of the exemplary embodiments of the disclosure.

FIG. 13 illustrates a process of checking buffering data for the proposed playback method in accordance with one of the exemplary embodiments of the disclosure. It is noted that the process of FIG. 13 may replace the step S1004 of FIG. 10 when the process of FIG. 10 is used for applying smart bitrate adaptation to playback sessions having multiple video adaptation sets and/or multiple audio adaptation sets. In step S1301, the electronic device would check whether a primary track (e.g., adaptation set in MPEG-DASH) which is in an active state of the active playback session has sufficient buffering data. If the result of step S1301 is no, then the electronic device would have determined that there is insufficient buffering data. If the result of step S1301 is yes, then in step S1302, the electronic device would check if there is any other tracks which is in an inactive state in the active playback session. If the result of step S1302 is no, then the electronic device would have determined that there are sufficient buffering data. If the result of step S1302 is yes, then in step S1303, the electronic device would get a track i and check if the inactive track i has had enough buffering data. If the result of step S1303 is yes, then the process continues in step S1302 to check if there is any other inactive track. If the result of step S1303 is not, then the electronic device has determined that there is insufficient buffering data.

It should be noted that the audio and video buffering requirement could be different between an active track and an inactive track in an active playback session. For example, for the active audio and video tracks in the active playback session, more download buffering data could be required than the inactive track in the active playback session. As for the inactive track in the active playback session, the amount of buffering data would only need to be maintained at a sufficient level that does not allow the amount of pauses to downgrade a playback experience. In addition, since the demand for playback quality could different, the inactive track in the active playback session may only need to be downloaded at the lowest download bitrate or (with the least acceptable quality).

In view of the aforementioned descriptions, the disclosure is suitable for being used in an electronic device and provides a playback method used by an electronic device and an electronic device using the same method which would reduce power consumption when playing streaming content and avoid unnecessary downloading and decoding of data which would be unperceptive to the user of the electronic device.

According to an example, the content provider may encode a streaming session by using scalable video coding (SVC). By SVC, each segment of the streaming session may be encoded to generate multiple layers according to different bitrates. For example, if three different bitrates such as 256 Kbit/sec, 512 Kbits/sec and 1024 Kbits/sec are used, three levels: base layer (BL), 1st enhancement layer (EL1), 2nd enhancement layer (EL2) can be generated. The electronic device may have different download policies to download different playback sessions of different activity levels (e.g. active, to-be-active, inactive). For example, for the active playback session which is assigned with the first priority order, the download policy may be downloading the segments of all the three layers, BL, EL1 and EL2, such that the electronic device can combine the segments of BL, EL1 and EL2 to obtain the active playback session of the highest quality. For the to-be-active playback session which is assigned with the second priority order, the download policy may be downloading the segments of two layers, BL and EL1, such that the electronic device can combine the segments of BL and EL1 to obtain the (to-be-active) playback session of the medium quality. For the inactive playback session which is assigned with the third priority order, the download policy may be downloading the segments of only the base layer BL and the electronic device may only obtain the inactive playback session of the lowest quality.

For example, it is assumed that the available bandwidth of an electronic device which is a desktop computer is 1536 Kbits/sec, and there are three playback sessions being played by a browser according to the conventional playback mechanism, and all three playback sessions have been opened and played at the same time. In such a condition, three audio mixings could be heard, even though only one playback session is visible to a user. The end result of such scenario is that each playback session would download segments of bitrate 512 Kbits per seconds on average. Under such scenario, the electronic device wastes bandwidth 1024 Kbit/sec to download the playback sessions which are invisible to the user. In this way, the remaining visible playback session cannot achieve the best display quality.

However, by using the proposed disclosure, the electronic device can fully download the media content of the active playback session and enjoy the quality a 1024 Kbits/sec. For the remaining 512 Kbits/sec, if the to-be-active playback session may require 512 Kbits/sec, then all of the remaining resources will be spent on the to-be-active playback session. If the to-be-active playback session and inactive playback session could be sufficient at 256 Kbits/sec, then the electronic device would allocate the downloads of the to-be-active playback session and the inactive playback session at 256 Kbits/sec each.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A video playback method used by an electronic device, the method comprising:
displaying a first playback session which comprises an on-demand streaming session in a foreground of a display of the electronic device;
switching, at a first playback time ($t_1$), the first playback session from being displayed in the foreground to a background in which the on-demand streaming session ceases streaming;
recording the first playback time and a first clock time ($T_1$) in response to switching the first playback session from being displayed in the foreground to the background;
switching the first playback session back from the background to being displayed in the foreground;
recording a second clock time ($T_2$) in response to switching the first playback session back from the background to being displayed in the foreground; and
changing the first playback session as being displayed in the foreground to a second playback time ($t_2$) which is determined according to $t_2=t_1+(T_2-T_1)$,
wherein switching the first playback session from being displayed in the foreground to the background in which the on-demand streaming session ceases streaming further comprising:
lowering a decoding rate of the first playback session to a predetermined decoding rate in response to switching the first playback session back from being displayed in the foreground to the background, wherein the predetermined decoding rate is greater than zero.

2. The method of claim 1, wherein the foreground of the display comprises either a foreground frame or a foreground window and the background of the display comprises either a background frame or a background window, and the background in which the on-demand streaming session ceases streaming comprising:
the first playback session which has been switched to the background in which the on-demand streaming session ceases is either partially or completely invisible.

3. The method of claim 1, wherein displaying the first playback session in the foreground of the display comprising:
displaying the first playback session which is completely visible in the foreground of the display.

4. The method of claim 1, wherein switching the first playback session from being displayed in the foreground to the background in which the on-demand streaming session ceases streaming further comprising:
releasing a resource associated with the first playback session in response to switching the first playback session from being displayed in the foreground to the background.

5. The method of claim 4, wherein releasing the resource associated with the first playback session comprising:
downloading the first playback session of a low quality which insures seamless transition in response to switching the first playback session back from being displayed in the foreground to the background.

6. The method of claim 1, further comprising:
stopping downloading the first playback session in response to switching, at the first playback time ($t_1$), the first playback session from being displayed in the foreground to the background in which the on-demand streaming session ceases streaming.

7. The method of claim 1, further comprising:
activating a second playback session while the first playback session is being displayed in the foreground;
displaying the second playback session in the foreground; and
determining whether the number of playback sessions after activating the second playback session has exceeded a maximum number of playback sessions.

8. The method of claim 7, wherein in response to the number of playback sessions after activating the second playback session has exceeded the maximum number of playback sessions, the method further comprising:
switching, at the first playback time, the first playback session from being displayed in the foreground to the background.

9. The method of claim 7, wherein in response to the number of playback sessions after activating the second playback session has not exceeded the maximum number of playback sessions, the method further comprising:
simultaneously displaying the first playback session in the foreground of the display and also the second playback session in another foreground of the display.

10. The method of claim 7, wherein switching the first playback session from being displayed in the foreground to the background comprises:
switching the first playback session from being displayed in the foreground to the background in response to activating the second playback session; and
downloading the first playback session of a low quality lower than the quality of the second playback session.

11. The method of claim 7, wherein switching the first playback session from being displayed in the foreground to the background comprises:
switching the first playback session from being displayed in the foreground to the background in response to activating the second playback session; and
setting a first decoding rate associated with the first playback session to be lower than a second decoding rate associated with the second playback session.

12. An electronic device comprising:
a transceiver;
a non-transitory storage medium;
an electronic display; and
a processor coupled to the transceiver, the storage medium, and the display and configured at least for:
displaying, via the display, a first playback session which comprises an on-demand streaming session in a foreground of a display of the electronic device;
switching, at a first playback time ($t_1$), the first playback session from being displayed in the foreground to a background in which the on-demand streaming session ceases streaming;
recording the first playback time and a first clock time ($T_1$) in response to switching the first playback session from being displayed in the foreground to the background;
switching the first playback session back from the background to being displayed in the foreground;
recording a second clock time ($T_2$) in response to switching the first playback session back from the background to being displayed in the foreground; and
changing the first playback session as being displayed in the foreground of the display to a second playback time ($t_2$) which is determined according to $t_2=t_1+(T_2-T_1)$, wherein the processor configured for switching the first playback session from being displayed in the foreground to the background in which the on-demand streaming session ceases streaming further comprising:
   lowering a decoding rate of the first playback session to a predetermined decoding rate in response to switching the first playback session back from being displayed in the foreground to the background, wherein the predetermined decoding rate is greater than zero.

13. The device of claim 12, wherein the foreground of the display comprises either a foreground frame or a foreground window and the background of the display comprises either a background frame or a background window, and the background in which the on-demand streaming session ceases streaming comprising:
   the first playback session which has been switched to the background in which the on-demand streaming session ceases is either partially or completely invisible.

14. The device of claim 12, wherein the processor configured for displaying, via the display, the first playback session in the foreground of the display comprising:
   displaying the first playback session which is completely visible in the foreground of the display.

15. The display of claim 12, wherein the processor configured for switching the first playback session from being displayed in the foreground to the background in which the on-demand streaming session ceases streaming further comprising:
   releasing a resource associated with the first playback session in response to switching the first playback session from being displayed in the foreground to the background.

16. The device of claim 15, wherein the processor configured for releasing the resource associated with the first playback session comprising:
   downloading, via the transceiver, the first playback session of a low quality which insures seamless transition in response to switching the first playback session back from being displayed in the foreground to the background.

17. The device of claim 12, wherein the processor is further configured at least for:
   stopping, via the transceiver, downloading the first playback session in response to switching, at the first playback time ($t_1$), the first playback session from being displayed in the foreground of the display to the background in which the on-demand streaming session ceases streaming.

18. The device of claim 12, wherein the processor is further configured at least for:
   activating a second playback session while the first playback session is being displayed in the foreground;
   displaying, via the display, the second playback session in the foreground; and
   determining whether the number of playback sessions after activating the second playback session has exceeded a maximum number of playback sessions.

19. The device of claim 18, wherein in response to the number of playback sessions after activating the second playback session has exceeded the maximum number of playback sessions, the processor is further configured at least for:
   switching, at the first playback time, the first playback session from being displayed in the foreground to the background.

20. The device of claim 18, wherein in response to the number of playback sessions after activating the second playback session has not exceeded the maximum number of playback sessions, the processor is further configured at least for:
   simultaneously displaying the first playback session in the foreground of the display and also the second playback session in another foreground of the display.

21. The device of claim 18, wherein the processor configured for switching the first playback session from being displayed in the foreground to the background comprises:
   switching the first playback session from being displayed in the foreground to the background in response to activating the second playback session; and
   downloading, via the transceiver, the first playback session of a low quality lower than the quality of the second playback session.

22. The device of claim 18, wherein the processor configured for switching the first playback session from being displayed in the foreground to the background comprises:
   switching the first playback session from being displayed in the foreground to the background in response to activating the second playback session; and
   setting a first decoding rate associated with the first playback session to be lower than a second decoding rate associated with the second playback session.

* * * * *